United States Patent
Yamada et al.

(10) Patent No.: US 12,240,944 B2
(45) Date of Patent: Mar. 4, 2025

(54) OPTICAL LENS

(71) Applicant: TEIJIN LIMITED, Osaka (JP)

(72) Inventors: Kyosuke Yamada, Osaka (JP);
Manabu Matsui, Osaka (JP);
Takatsune Yanagida, Osaka (JP);
Kazuyoshi Ogasawara, Osaka (JP);
Kazunori Nunome, Osaka (JP);
Keisuke Sato, Osaka (JP); Tatsuya Oyama, Osaka (JP); Yasuhiko Tomonari, Osaka (JP)

(73) Assignee: TEIJIN LIMITED, Osaka (JP)

( * ) Notice: Subject to any disclaimer, the term of this patent is extended or adjusted under 35 U.S.C. 154(b) by 745 days.

(21) Appl. No.: 17/434,138

(22) PCT Filed: Feb. 26, 2020

(86) PCT No.: PCT/JP2020/007855
§ 371 (c)(1),
(2) Date: Aug. 26, 2021

(87) PCT Pub. No.: WO2020/175577
PCT Pub. Date: Sep. 3, 2020

(65) Prior Publication Data
US 2022/0146713 A1 May 12, 2022

(30) Foreign Application Priority Data
Feb. 27, 2019 (JP) .................................. 2019-034940

(51) Int. Cl.
*C08G 64/06* (2006.01)
*C08G 63/64* (2006.01)
(Continued)

(52) U.S. Cl.
CPC ............. *C08G 64/06* (2013.01); *C08G 63/64* (2013.01); *C08G 63/672* (2013.01); *C08G 64/04* (2013.01);
(Continued)

(58) Field of Classification Search
CPC ........ C08G 63/64; C08G 64/04; C08G 64/02; C08L 69/005; C08L 2201/10; G02B 1/041
See application file for complete search history.

(56) References Cited

U.S. PATENT DOCUMENTS

| 4,584,335 A | 4/1986 | Parker |
| 5,446,173 A | 8/1995 | Kanesaki et al. |

(Continued)

FOREIGN PATENT DOCUMENTS

| CN | 1711303 | 12/2005 |
| CN | 101680987 | 3/2010 |

(Continued)

OTHER PUBLICATIONS

International Search Report issued Oct. 19, 2010 in International (PCT) Application No. PCT/JP2010/062481.
(Continued)

*Primary Examiner* — Kregg T Brooks
*Assistant Examiner* — David R. Foss
(74) *Attorney, Agent, or Firm* — Wenderoth, Lind & Ponack, L.L.P.

(57) ABSTRACT

The invention provides an optical lens that can provide small-sized imaging modules. The optical lens of the invention comprises a thermoplastic resin having a refractive index (nD) and Abbe number (ν) satisfying the following mathematical formula (A):

$$nD \leq -0.02 \times \nu + 2.040 \quad (A)$$

(where $1.660 < nD$).

6 Claims, 4 Drawing Sheets

(51) Int. Cl.

|  |  |
|---|---|
| *C08G 63/672* | (2006.01) |
| *C08G 64/04* | (2006.01) |
| *C08G 64/30* | (2006.01) |
| *C08L 69/00* | (2006.01) |
| *G02B 1/04* | (2006.01) |
| *G02B 13/00* | (2006.01) |
| *C08G 64/08* | (2006.01) |

(52) U.S. Cl.
CPC ............ *C08G 64/30* (2013.01); *C08L 69/005* (2013.01); *G02B 1/041* (2013.01); *G02B 13/002* (2013.01); *C08G 64/08* (2013.01); *C08L 2201/10* (2013.01); *C08L 2203/20* (2013.01)

(56) References Cited

U.S. PATENT DOCUMENTS

| 5,532,331 | A | 7/1996 | Bales et al. |
| 5,910,562 | A | 6/1999 | Miura et al. |
| 6,310,161 | B1 | 10/2001 | Weissman |
| 11,261,294 | B2 * | 3/2022 | Yamada ............... C08G 64/04 |
| 2005/0250930 | A1 | 11/2005 | Ikeda et al. |
| 2008/0085955 | A1 | 4/2008 | Yanagida et al. |
| 2010/0048855 | A1 | 2/2010 | Kato et al. |
| 2010/0104777 | A1 | 4/2010 | Motoyoshi et al. |
| 2012/0120356 | A1 | 5/2012 | Washizu et al. |
| 2012/0123083 | A1 | 5/2012 | Nunome et al. |
| 2012/0308796 | A1 | 12/2012 | Tanaka et al. |
| 2013/0261283 | A1 | 10/2013 | Motoyoshi et al. |
| 2014/0051300 | A1 | 2/2014 | Yamakami |
| 2014/0268333 | A1 | 9/2014 | Tanaka et al. |
| 2015/0285954 | A1 | 10/2015 | Ishizuka et al. |
| 2016/0319069 | A1 | 11/2016 | Shigematsu et al. |
| 2016/0326311 | A1 | 11/2016 | Motoyoshi et al. |
| 2019/0241703 | A1 | 8/2019 | Kato et al. |
| 2020/0181325 | A1 | 6/2020 | Shiratake et al. |
| 2020/0190259 | A1 | 6/2020 | Kato et al. |

FOREIGN PATENT DOCUMENTS

| CN | 102257412 | 11/2011 |
| CN | 102352039 | 2/2012 |
| CN | 102630234 | 8/2012 |
| CN | 103201313 | 7/2013 |
| CN | 103339531 | 10/2013 |
| CN | 104263287 | 1/2015 |
| CN | 104718237 | 6/2015 |
| CN | 106029735 | 10/2016 |
| EP | 0 242 465 | 10/1987 |
| EP | 0 787 756 | 8/1997 |
| EP | 1 551 900 | 7/2005 |
| EP | 2 034 337 | 3/2009 |
| EP | 3 677 614 | 7/2020 |
| EP | 3 733 734 | 11/2020 |
| EP | 3 747 856 | 12/2020 |
| JP | 63-63718 | 3/1988 |
| JP | 6-145317 | 5/1994 |
| JP | 6-305044 | 11/1994 |
| JP | 07-198901 | 8/1995 |
| JP | 7-509269 | 10/1995 |
| JP | 8-54615 | 2/1996 |
| JP | 08-311189 | 11/1996 |
| JP | 9-268225 | 10/1997 |
| JP | 10-7782 | 1/1998 |
| JP | 10-87800 | 4/1998 |
| JP | 10-101786 | 4/1998 |
| JP | 10-120777 | 5/1998 |
| JP | 11-269259 | 10/1999 |
| JP | 2000-204150 | 7/2000 |
| JP | 2000-212271 | 8/2000 |
| JP | 2000-219736 | 8/2000 |
| JP | 2000-302857 | 10/2000 |
| JP | 2001-72872 | 3/2001 |
| JP | 2002-284871 | 10/2002 |
| JP | 2002-309015 | 10/2002 |
| JP | 2002-332345 | 11/2002 |
| JP | 2004-23576 | 1/2004 |
| JP | 2004-67990 | 3/2004 |
| JP | 2005-187661 | 7/2005 |
| JP | 2005-232252 | 9/2005 |
| JP | 2005-241962 | 9/2005 |
| JP | 2006-47736 | 2/2006 |
| JP | 2007-246629 | 9/2007 |
| JP | 2009-80424 | 4/2009 |
| JP | 2009-235256 | 10/2009 |
| JP | 2009-249307 | 10/2009 |
| JP | 2010-189562 | 9/2010 |
| JP | 2010-275412 | 12/2010 |
| JP | 2011-12178 | 1/2011 |
| JP | 2011-168722 | 9/2011 |
| JP | 2012-155193 | 8/2012 |
| JP | 2012-162590 | 8/2012 |
| JP | 2013-64119 | 4/2013 |
| JP | 2013-76982 | 4/2013 |
| JP | 2014-38772 | 2/2014 |
| JP | 2014-185325 | 10/2014 |
| JP | 2014-205734 | 10/2014 |
| JP | 2014-205829 | 10/2014 |
| JP | 2015-086265 | 5/2015 |
| JP | 2016-69643 | 5/2016 |
| JP | 2017-082038 | 5/2017 |
| JP | 2017-155163 | 9/2017 |
| JP | 2017-171885 | 9/2017 |
| JP | 2017-179323 | 10/2017 |
| JP | 2017-207759 | 11/2017 |
| JP | 2018-2894 | 1/2018 |
| JP | 2018-059074 | 4/2018 |
| JP | 2018-104691 | 7/2018 |
| JP | 2018-177887 | 11/2018 |
| KR | 10-1532334 | 6/2015 |
| WO | 94/02533 | 2/1994 |
| WO | 2007/142149 | 12/2007 |
| WO | 2009/058396 | 5/2009 |
| WO | 2011/010741 | 1/2011 |
| WO | 2014/054710 | 4/2014 |
| WO | 2014/073496 | 5/2014 |
| WO | 2015/170691 | 11/2015 |
| WO | 2017/010318 | 1/2017 |
| WO | 2017/146171 | 8/2017 |
| WO | 2018/008483 | 1/2018 |
| WO | 2018/016516 | 1/2018 |
| WO | 2019/044214 | 3/2019 |
| WO | 2019/044875 | 3/2019 |
| WO | 2019/131841 | 7/2019 |

OTHER PUBLICATIONS

International Preliminary Report on Patentability and Written Opinion issued Feb. 7, 2012 in International (PCT) Application No. PCT/JP2010/062481.

International Search Report issued May 25, 2010 in International (PCT) Application No. PCT/JP2010/053711.

International Search Report issued Mar. 31, 2015 in International (PCT) Application No. PCT/JP2015/056272.

Translation of International Preliminary Report on Patentability and Written Opinion of the International Searching Authority issued Sep. 15, 2016 in International (PCT) Application No. PCT/JP2015/056272.

International Search Report issued Aug. 21, 2018 in International (PCT) Patent Application No. PCT/JP2018/026613, with translation.

International Search Report issued May 7, 2019 in International (PCT) Application No. PCT/JP2019/011826.

Extended European Search Report issued Jan. 3, 2013 in European Application No. 10802361.5.

International Search Report issued Jun. 11, 2019 in International (PCT) Application No. PCT/JP2019/009776.

(56) References Cited

OTHER PUBLICATIONS

International Search Report issued May 19, 2020 in International (PCT) Application No. PCT/JP2020/007855.

\* cited by examiner

OPTICAL LENS

FIELD

The present invention relates to a novel optical lens comprising a thermoplastic resin with a high refractive index and a low Abbe number.

BACKGROUND

Imaging modules are used in devices such as cameras, video cameras, camera-equipped cellular phones, videophones and camera-equipped door phones. In recent years, downsizing has been a particular requirement for the optical systems used in such imaging modules. However, downsizing of an optical system leads to the major problem of chromatic aberration in the optical system. It is known that chromatic aberration can be compensated for by using a combination of an optical lens having a high refractive index and a reduced Abbe number for high dispersion, with an optical lens having a low refractive index and increased Abbe number for low dispersion.

Known resins with high refractive indexes and low Abbe numbers used as optical lenses for high dispersion include resins with fluorene backbones and binaphthalene backbones. High refractive index resins with a refractive index of 1.64, using 9,9-bis(4-(2-hydroxyethoxy)phenyl)fluorene, are described in PTLs 1 and 2, for example. PTL 3 describes a thermoplastic resin comprising 9,9-bis(4-(2-hydroxyethoxy)-3-phenylphenyl)fluorene.

CITATION LIST

Patent Literature

[PTL 1] International Patent Publication No. 2007/142149
[PTL 2] Japanese Unexamined Patent Publication HEI No. 7-198901
[PTL 3] Japanese Unexamined Patent Publication No. 2015-86265

SUMMARY

Technical Problem

Imaging lenses are designed with combinations of such lenses with mutually differing optical characteristics, as described above. The refractive index and Abbe number that a single lens should have therefore cannot be defined for all cases since it depends on the refractive index and Abbe number of the other lens.

Designers of imaging lenses have been limited in the lenses that can be used in designs because when the intention is to employ a lens having a specific refractive index and a specific Abbe number, such a lens may not exist in some cases.

The present invention provides an optical lens that can extend the range of options to allow different types of lenses to be employed by designers of imaging lenses.

Solution to Problem

The present inventors have found that the problem can be solved by an invention having the following aspects.

<Aspect 1>
An optical lens comprising a thermoplastic resin, wherein the thermoplastic resin has a b* value according to the CIE1976 (L*a*b*) color system of 10.0 or lower, as measured using a 13 mass % solution in methylene chloride (a solution of 1.0 g dissolved in 5 ml of methylene chloride), and has a refractive index (nD) and Abbe number (v) satisfying the following mathematical formula (A):

$$nD \leq -0.02 \times v + 2.040 \tag{A}$$

(where $1.660 < nD$).

<Aspect 2>
The optical lens according to aspect 1, wherein the thermoplastic resin has a refractive index (nD) and Abbe number (v) satisfying the following mathematical formula (B):

$$nD \geq -0.02 \times v + 1.960 \tag{B}$$

<Aspect 3>
The optical lens according to aspect 1 or 2, wherein:
the thermoplastic resin includes a spatial structural component unit,
the spatial structural component unit includes 4 or more aromatic groups selected from the group consisting of monocyclic aromatic groups and fused polycyclic aromatic groups, and
the spatial structural component unit has 3 or more monocyclic aromatic groups in a conjugated structure, or one or more monocyclic aromatic groups and one or more fused polycyclic aromatic groups in a conjugated structure, or two or more fused polycyclic aromatic groups in a conjugated structure.

<Aspect 4>
The optical lens according to any one of aspects 1 to 3, wherein the spatial structural component unit has a fluorene-based component unit or anthrone-based component unit including an aromatic substituent on a side chain, and/or a binaphthalene-based component unit including an aromatic substituent.

<Aspect 5>
The optical lens according to any one of aspects 1 to 4, wherein the relative viscosity of the thermoplastic resin is 0.12 to 0.40.

<Aspect 6>
The optical lens according to any one of aspects 1 to 5, wherein the glass transition temperature of the thermoplastic resin is 130 to 170° C.

<Aspect 7>
The optical lens according to any one of aspects 1 to 6, wherein the thermoplastic resin is a polyester, polyester carbonate or polycarbonate.

<Aspect 8>
The optical lens according to any one of aspects 1 to 7, wherein the amount of residual palladium in the thermoplastic resin is 10 ppm or lower.

DESCRIPTION OF EMBODIMENTS

<Optical Lens>

The optical lens of the invention comprises a thermoplastic resin, wherein the thermoplastic resin has a b* value according to the CIE1976 (L*a*b*) color system of 10.0 or lower, as measured using a 13 mass % solution in methylene chloride (a solution of 1.0 g dissolved in 5 ml of methylene chloride), and has a refractive index (nD) and Abbe number (v) satisfying the following numerical formula (A):

$$nD \leq -0.02 \times v + 2.040 \quad (A)$$

(where 1.660<nD).

Figure 1:
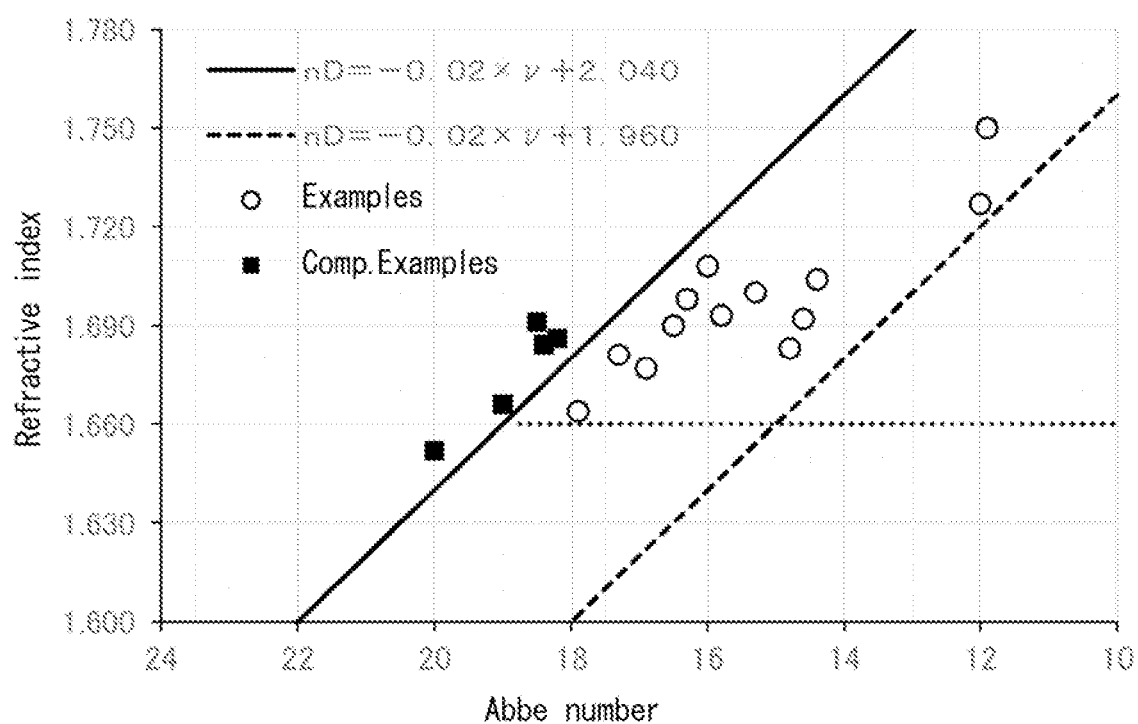
FIG. 1 shows the relationship between refractive index and Abbe number for a thermoplastic resin used in a lens of the invention, and a conventional resin.

When refractive index and Abbe number were plotted as shown in FIG. 1, a high refractive index as in the prior art (Comparative Example) produced an Abbe number of about 20, with a distribution outside of the range of mathematical formula (A). In contrast, the thermoplastic resin used in the lens of the invention has a high refractive index and low Abbe number distributed in a range that has not existed in the prior art, being distributed in the range described by mathematical formula (A). The thermoplastic resin to be used in the optical lens of the invention is also excellent in that it has a small degree of coloration.

Since the resin used has a refractive index and Abbe number in the specified relationship, and low coloration, an imaging lens designer can employ various types of lenses, providing a major advantage for lens design. Such an optical lens is especially advantageous for downsizing of imaging lenses.

<Physical Properties of Thermoplastic Resin>

The thermoplastic resin used in the optical lens of the invention has a refractive index (nD) of greater than 1.660 at a wavelength of 589 nm, measured at 25° C. The refractive index (nD) may be 1.670 or greater, 1.680 or greater, 1.690 or greater, 1.700 or greater or 1.710 or greater, and 1.770 or lower, 1.750 or lower, 1.730 or lower, 1.710 or lower, 1.700 or lower, 1.695 or lower or 1.690 or lower. For example, the refractive index (nD) may be greater than 1.660 and 1.770 or lower, or 1.670 to 1.750, or 1.680 to 1.730.

As used herein, the "Abbe number (v)" is that calculated from the refractive indexes measured at wavelengths of 486 nm, 589 nm and 656 nm at 25° C., using the following formula, the values being measured by the method described in the Examples:

$$v = (nD-1)/(nF-nC)$$

(where nD is the refractive index at a wavelength of 589 nm, nC is the refractive index at a wavelength of 656 nm and nF is the refractive index at a wavelength of 486 nm).

The Abbe number (v) of the thermoplastic resin is less than 18.75. The Abbe number (v) may be 18.0 or lower, 17.0 or lower, 16.0 or lower or 15.0 or lower, and it may be 10.0 or greater, 11.0 or greater, 12.0 or greater, 13.0 or greater, 14.0 or greater, 15.0 or greater or 16.0 or greater. For example, the Abbe number (v) may be 10.0 or greater and less than 18.75, 11.0 to 18.0, or 14.0 to 17.5.

The thermoplastic resin may have a refractive index (nD) and Abbe number (v) satisfying the following mathematical formula (B):

$$nD \geq -0.02 \times v + 1.960 \quad (B)$$

However, the thermoplastic resin may also have a refractive index (nD) and Abbe number (v) satisfying the following mathematical formula (C):

$$nD < -0.02 \times v + \alpha \quad (C)$$

(where α is 2.035, 2.030, 2.025, 2.020 or 2.015).

The thermoplastic resin may also have a refractive index (nD) and Abbe number (v) satisfying the following mathematical formula (D):

$$nD \geq -0.02 \times v + \beta \quad (D)$$

(where β is 1.965, 1.970, 1.975, 1.980, 1.985, 1.990, 1.995 or 2.000).

The thermoplastic resin has a low degree of coloration, and particularly a yellowish color. Specifically, the b* value according to the CIE1976 (L*a*b*) color system is 10.0 or lower and preferably 8.0 or lower, 6.0 or lower, 5.0 or lower or 3.0 or lower, and it may be 0.01 or higher, 0.1 or higher, 1.0 or higher or 3.0 or higher. For example, the b* value may be 0.01 to 10.0 or 0.1 to 5.0. The b* value is the value in the CIE1976 (L*a*b*) color system, measured with a spectrophotometer for a solution of 1.0 g dissolved in 5 ml of methylene chloride (a solution dissolved at 13 mass % in methylene chloride).

Although palladium catalysts are used for obtaining thermoplastic resins for optical lenses, the present inventors have found that the residual amount of palladium catalyst is connected with coloration of the thermoplastic resin. The present inventors have also found that a useful optical lens can be obtained by using a thermoplastic resin as described above, having the residual amount of palladium catalyst adjusted.

The glass transition temperature of the thermoplastic resin, when measured at a temperature-elevating rate of 20° C./min using a DSC-60A by Shimadzu Corp., may be 120° C. or higher, 130° C. or higher, 140° C. or higher, 150° C. or higher or 160° C. or higher, and 190° C. or lower, 180° C. or lower, 170° C. or lower or 160° C. or lower. For example, the glass transition temperature may be 120° C. to 190° C. or 130° C. to 170° C. The glass transition temperature is preferably within this range as the balance between heat resistance and moldability will be excellent.

The relative viscosity of the thermoplastic resin may be 0.10 or higher, 0.12 or higher, 0.15 or higher, 0.18 or higher, 0.20 or higher or 0.25 or higher, and 0.5 or lower, 0.45 or lower, 0.4 or lower, 0.35 or lower or 0.3 or lower. For example, the relative viscosity may be 0.12 to 0.40, 0.15 to 0.35 or 0.18 to 0.30. The relative viscosity is preferably within this range as the balance between moldability and mechanical strength will be excellent. The relative viscosity is measured at 20° C., using a solution of 0.7 g of the resin obtained upon completion of polymerization, in 100 ml of methylene chloride.

<Structure of Thermoplastic Resin>

The structure of the thermoplastic resin used in the optical lens of the invention is not particularly restricted so long as it has the refractive index (nD) and Abbe number (v) specified above. Examples of such thermoplastic resins include polyesters, polyester carbonates and polycarbonates.

A thermoplastic resin having the specified refractive index and Abbe number preferably includes a spatial structural component unit, where the spatial structural component unit preferably comprises 4 or more aromatic groups selected from the group consisting of monocyclic aromatic groups and fused polycyclic aromatic groups.

Most preferably, the spatial structural component unit is a conjugated structure of 3 or more monocyclic aromatic groups, or a conjugated structure of one or more monocyclic aromatic groups and one or more fused polycyclic aromatic groups, or a conjugated structure of two or more fused polycyclic aromatic groups. In this case, the monocyclic aromatic groups and fused polycyclic aromatic groups preferably form conjugated bonds each with a single bond. The refractive index will tend to be even higher if the conjugated structure is thus spread out. Because this will result in a high increase in the refractive index in the short wavelength range and a significantly reduced Abbe number, it is useful for an optical lens for high dispersion use.

For the present purpose, a conjugated structure is defined as a conjugated structure where the π elections of an aromatic group or multiple bonds are delocalized.

The spatial structural component unit preferably has a fluorene-based component unit or anthrone-based component unit including an aromatic substituent on a side chain, and/or a binaphthalene-based component unit including an aromatic substituent. Such a fluorene-based component unit or anthrone-based component unit and binaphthalene-based component unit can be obtained by reacting an organometallic compound (such as a boronic acid aromatic compound) with a fluorene-based, anthrone-based or binaphthalene-based halide (such as a bromide) using a transition metal catalyst (such as a platinum element-based catalyst, and especially a palladium-based catalyst).

Unless otherwise specified, the term "aromatic group" as used herein is not limited to aromatic groups formed from carbon atoms and hydrogen atoms alone, and encompasses heteroatom-containing heterocyclic aromatic groups as well. Heteroatoms include oxygen atoms, sulfur atoms and nitrogen atoms. The term "aromatic group" also includes monocyclic aromatic groups and fused polycyclic aromatic groups, unless otherwise specified.

For example, a thermoplastic resin to be used in an optical lens of the invention may contain a spatial structural component unit as described above at 10 mol % or greater, 20 mol % or greater, 30 mol % or greater, 40 mol % or greater, 50 mol % or greater, 60 mol % or greater or 70 mol % or greater, and 100 mol % or lower, 90 mol % or lower, 80 mol % or lower, 70 mol % or lower, 60 mol % or lower, 50 mol % or lower or 40 mol % or lower. For example, the thermoplastic resin may include such a spatial structural component unit at 10 mol % to 100 mol % or 20 mol % to 100 mol %.

Examples of fluorene-based component units or anthrone-based component units having aromatic substituents on side chains include repeating units represented by the following formula (1).

(Repeating units of formula (1))

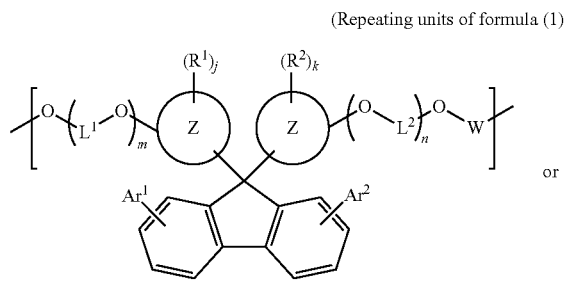

or

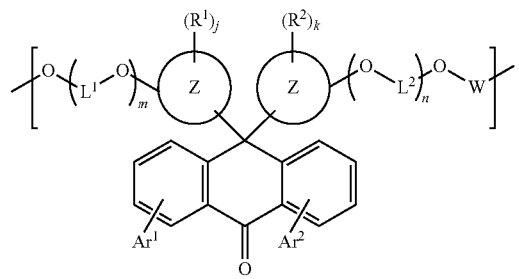

(1)

In the formulas, ring Z represents the same or different aromatic hydrocarbon rings, $R^1$ and $R^2$ each independently represent a hydrogen atom, a halogen atom or a hydrocarbon group of 1 to 12 carbon atoms optionally containing an aromatic group, $Ar^1$ and $Ar^2$ each represent an aromatic group optionally containing a substituent, $L^1$ and $L^2$ each independently represent a divalent linking group, j and k each independently represent an integer of 0 or greater, m and n each independently represent 0 or 1, and W is at least one group selected from groups represented by the following formula (2) or (3).

(2)

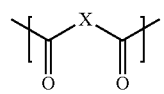

(3)

In the formula, X represents a divalent linking group.

A conjugated structure is not formed between the two benzene rings which are monocyclic aromatic groups included in fluorene or anthrone, and the ring Z situated on the main chain. In the repeating unit of formula (1), however, a conjugated structure may be formed between at least the monocyclic aromatic group of the fluorene or anthrone and $Ar^1$ and/or $Ar^2$.

The aromatic hydrocarbon ring represented by ring Z in formula (1) may be a benzene ring or a fused polycyclic aromatic hydrocarbon ring having at least a benzene ring backbone, with preferred examples being fused bi- to tetracyclic hydrocarbon rings such as fused bicyclic hydrocarbon rings and fused tricyclic hydrocarbon rings.

A fused bicyclic hydrocarbon ring is preferably $C_{8-20}$, such as an indene ring or naphthalene ring, with $C_{10-16}$ fused bicyclic hydrocarbon rings being more preferred. A fused tricyclic hydrocarbon ring is preferably an anthracene ring or phenanthrene ring.

A benzene ring or naphthalene ring is preferred for the ring Z.

Among specific examples of aromatic hydrocarbon rings represented by ring Z in formula (1), 1,4-phenylene, 1,4-naphthalenediyl and 2,6-naphthalenediyl groups are preferred and 1,4-phenylene and 2,6-naphthalenediyl groups are more preferred.

In formula (1), $R^1$ and $R^2$ each independently represent a hydrogen atom, a halogen atom or a hydrocarbon group optionally containing an aromatic group of 1 to 12 carbon atoms, with a hydrogen atom, a methyl group or a phenyl group being preferred.

Examples of hydrocarbon groups represented by $R^1$ and $R^2$ in formula (1) include alkyl, cycloalkyl, aryl, naphthyl and aralkyl groups.

Specific preferred examples of alkyl groups include $C_{1-6}$ alkyl groups, $C_{1-4}$ alkyl groups or $C_{1-3}$ alkyl groups such as methyl, ethyl, propyl, isopropyl, butyl and r-butyl groups, with $C_{1-4}$ alkyl groups and $C_{1-3}$ alkyl groups being preferred, $C_{1-3}$ alkyl groups being more preferred and methyl and ethyl groups being even more preferred.

Among specific examples of cycloalkyl groups, $C_{5-8}$ cycloalkyl groups and $C_{5-6}$ cycloalkyl groups such as cyclopentyl and cyclohexyl groups are preferred, and $C_{5-6}$ cycloalkyl groups are more preferred.

Preferred among specific examples of aryl groups are phenyl and alkylphenyl groups (such as mono- or dimethylphenyl, tolyl, 2-methylphenyl and xylyl groups), with phenyl groups being more preferred.

Specific preferred examples of naphthyl groups include 1-naphthyl group and 2-naphthyl group.

Specific preferred examples of aralkyl groups include $C_{6-10}$ to aryl-$C_{1-4}$ alkyl groups such as benzyl and phenethyl groups.

Preferred halogen atoms are fluorine, chlorine and bromine.

In formula (1), $Ar^1$ and $Ar^2$ may each independently represent a monocyclic aromatic group or fused polycyclic aromatic group of 4 to 10 carbon atoms optionally having a substituent, or a 5- or 6-membered heterocyclic aromatic group optionally having a substituent, or a fused heterocyclic aromatic group containing it, where the aromatic group of 4 to 10 carbon atoms is preferably an optionally substituted thienyl, phenyl or naphthyl group, and more preferably a phenyl or naphthyl group. In the case of naphthyl, a 1-naphthyl or 2-naphthyl group is more preferred. The bonding positions of $Ar^1$ and $Ar^2$ are preferably the 1-position and 8-position, the 2-position and 7-position, the 3-position and 6-position or the 4-position and 5-position, more preferably the 2-position and 7-position, the 3-position and 6-position or the 4-position and 5-position, and even more preferably the 2-position and 7-position, of the fluorene backbone or anthrone backbone. The heterocyclic aromatic group is preferably a 5- or 6-membered heterocyclic aromatic group or a fused heterocyclic aromatic group containing it, with heteroatoms including oxygen, sulfur and nitrogen atoms, and especially sulfur atom.

PTL 3 describes a thermoplastic resin obtained using 9,9-bis(4-(2-hydroxyethoxy)-3-phenylphenyl)fluorene having the following formula (hereunder referred to as "BOPPEF").

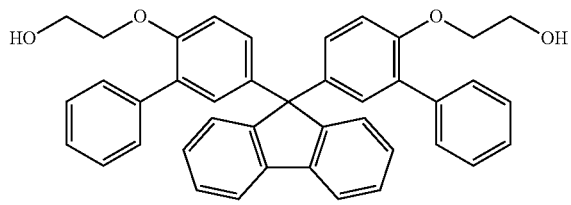 [SMILES: OCCOc1ccc(C2(c3ccc(OCCO)c(-c4ccccc4)c3)c3ccccc3-c3ccccc32)cc1-c1ccccc1]

The polymer described in PTL 3 has a phenyl group introduced into the main chain of a fluorene backbone polymer, but the present inventors have found that the refractive index of a polymer having an aromatic group introduced into a side chain of a fluorene backbone polymer is drastically increased compared to the refractive index of the polymer described in PTL 3. In this technical field, a difference of 0.01 in the refractive index is considered to be a very significant difference, and therefore when homopolymers were compared depending on the whether the aromatic group was included in the main chain portion or on a side chain portion, the finding of a difference in refractive index of 0.02 or greater was a very surprising result. A higher refractive index is connected with a lower Abbe number, and it has been found that a polymer with an aromatic group introduced into a side chain has a markedly lower Abbe number, thus deviating from the conventionally known linear relationship between refractive index and Abbe number.

The reason for this is believed to be as follows.

Specifically, based on the relational expression for molecular structure and refractive index, known as the Lorentz-Lorenz formula, it is known that the refractive index of a substance increases by raising the electron density of the molecules and reducing the molecular volume. Based on this theory, resins having fluorene backbones or binaphthalene backbones in the prior art have been given higher refractive indexes by introducing numerous aromatic groups into the molecule. In the polymer of PTL 3, an aromatic group is introduced into the main chain of the polymer of a resin formed from a fluorene backbone, to further increase the refractive index.

In contrast, the polymer of formula (1) above has a higher refractive index and a lower Abbe number. The reason for this is believed to be that the free volume is smaller than a polymer having an aromatic group introduced into the polymer main chain as according to prior art technology, whereby the refractive index is increased and the Abbe number is lowered (packing effect). When the aromatic groups are in a symmetrical positional relationship with the fluorene backbone, the packing effect is potentially more effective. Introduction of an aromatic group into a side chain also imparts an extensive fluorene ring-containing conjugated structure, significantly improving polarizability. Since the band gap is therefore smaller than a commonly used material of the prior art, the absorption edge in the ultraviolet region is shifted toward the visible light range end. A compound with a long conjugated structure therefore has a high refractive index property. It is conjectured that since the high refractive index property has a greater effect at the short wavelength end, the refractive index dispersion property is increased and the Abbe number is significantly lowered. This can be applied not only to polymers with fluorene backbones but also to polymers with anthrone backbones.

The present inventors have also found that, among the aromatic groups of $Ar^1$ and $Ar^2$, naphthyl groups impart an even higher refractive index compared to phenyl groups. The effect of increasing the refractive index was also found to differ significantly depending on the type of naphthyl group (1-naphthyl or 2-naphthyl group). A notable difference in birefringence was also found, depending on the type of naphthyl group (1-naphthyl or 2-naphthyl group). The reason for this is believed to be that the overall conjugated state of the side chains containing the fluorene or anthrone portions differs depending on differences in the bonding positions of the naphthyl groups. That is, presumably a large difference was seen between the refractive index and birefringence because the conjugated state between 2-naphthyl groups and fluorene or anthrone portions is more spread out than the conjugated state between 1-naphthyl groups and fluorene or anthrone portions and the polarizability is higher.

In addition, since it has a fluorene backbone or anthrone backbone with introduced aromatic groups, the heat resistance can be increased and a balance between birefringence and moldability can be obtained.

In formula (1), $L^1$ and $L^2$ each independently represent a divalent linking group, which is preferably an alkylene group of 1 to 12 carbon atoms, and more preferably an ethylene group. By adjusting the lengths of the linking groups $L^1$ and $L^2$, it is possible to adjust the glass transition temperature of the resin.

In formula (1), W is at least one group selected from groups represented by formula (2) or (3) above. When W is formula (2), formula (1) will be a carbonate unit, and when W is formula (3), formula (1) will be an ester unit.

The repeating unit represented by formula (1) is preferably included at a minimum of 5 mol %, 10 mol % or greater, 20 mol % or greater, 30 mol % or greater, 40 mol % or greater, 50 mol % or greater, 60 mol % or greater or 70 mol % or greater, based on the total repeating units. The repeating unit represented by formula (1) is preferably in this range as the refractive index will be high. It is also preferably included at a maximum of no greater than 100 mol %, no greater than 90 mol %, no greater than 80 mol %, no greater than 70 mol %, no greater than 60 mol %, no greater than 50 mol % or no greater than 40 mol %. If the repeating unit represented by formula (1) is in this range, it will be easier to obtain a resin with a high refractive index, a low Abbe number, low birefringence, and balance between heat resistance and moldability.

In formula (3), X represents a divalent linking group, preferably a hydrocarbon group optionally containing an aromatic group of 1 to 30 carbon atoms, and more preferably phenylene, naphthalenediyl or a group represented by the following formula (4) or formula (5).

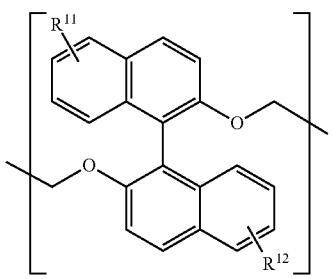

(4)

In the formula, $R^{11}$ and $R^{12}$ each independently represent a hydrogen atom, a hydrocarbon group of 1 to 12 carbon atoms optionally containing an aromatic group, or a halogen atom.

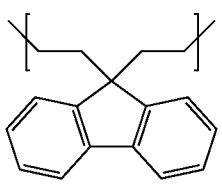

(5)

(Repeating Units of Formulas (6) to (8))

A thermoplastic resin to be used in the optical lens of the invention may include at least one selected from the group consisting of units represented by the following formulas (6) to (8), as a repeating unit.

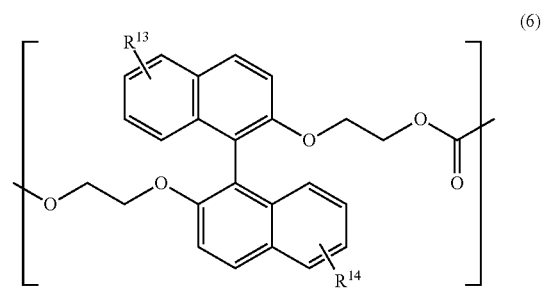

(6)

In the formula, $R^{13}$ and $R^{14}$ each independently represent a hydrogen atom, a hydrocarbon group of 1 to 12 carbon atoms optionally containing an aromatic group, or a halogen atom.

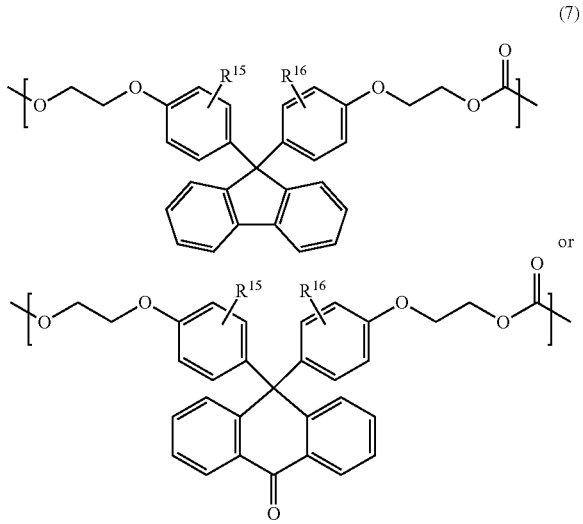

(7)

or

In the formulas, $R^{15}$ and $R^{16}$ each independently represent a hydrogen atom, a hydrocarbon group of 1 to 12 carbon atoms optionally containing an aromatic group, or a halogen atom.

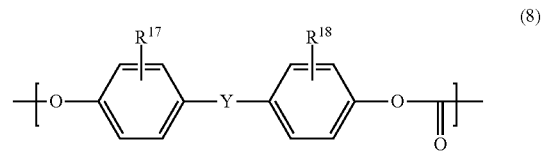

(8)

In the formula, $R^{17}$ and $R^{18}$ each independently represent a hydrogen atom, a hydrocarbon group of 1 to 12 carbon atoms optionally containing an aromatic group, or a halogen atom, and Y is a single bond or a divalent linking group.

When the thermoplastic resin includes at least one group selected from the group consisting of units represented by formulas (6) to (8) as a repeating unit, the molar ratio of repeating units, between the repeating unit represented by formula (1) and/or the repeating unit represented by the following formula (9), and the group comprising units represented by formulas (6) to (8), is preferably 95:5 to 5:95, more preferably 90:10 to 10:90, 80:20 to 20:80 or 70:30 to 30:70. If the molar ratio between repeating units represented by formula (1) and/or at least one repeating unit selected from the group consisting of repeating units represented by formula (9) below and units represented by formulas (6) to (8) is within this range, it will be easier to obtain a resin with a high refractive index and low Abbe number, and also with low birefringence, and balance between heat resistance and moldability.

In formulas (6) to (8), $R^{13}$ to $R^{18}$ each independently represent a hydrogen atom, a hydrocarbon group of 1 to 12 carbon atoms optionally containing an aromatic group, or a halogen atom, and it may be a hydrogen atom or phenyl group, in particular. Y is a single bond or a divalent linking group, and it may be a divalent hydrocarbon group of 1 to 12 carbon atoms, an oxygen atom or a sulfur atom, for example.

Examples of binaphthalene-based component units containing aromatic substituents include repeating units represented by the following formula (9).

(Repeating Units of Formula (9))

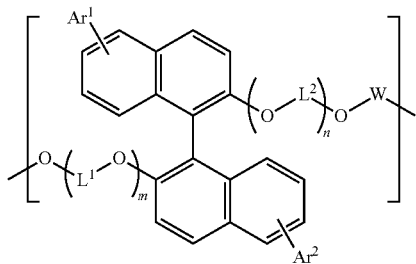

(9)

Here, $L^1$, $L^2$, W, m, n, $Ar^1$ and $Ar^2$ are the same as in formula (1). Since the two naphthyl groups in the binaphthalene structure are essentially orthogonal, the π electrons pass through the naphthyl groups without being delocalized, and therefore a conjugated structure is not formed. Each naphthyl group forms a conjugated structure with $Ar^1$ or $Ar^2$.

Most preferred among repeating units of formula (9) are repeating units of formula (9-1) in which $Ar^1$ and $Ar^2$ are positioned as shown below, because a conjugated structure will form more easily between the naphthyl groups and $Ar^1$ and $Ar^2$.

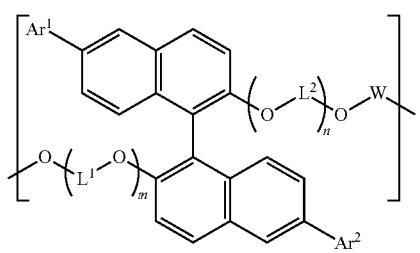

(9-1)

The repeating unit represented by formula (9) is preferably included at a minimum of 5 mol %, 10 mol % or greater, 20 mol % or greater, 30 mol % or greater, 40 mol % or greater, 50 mol % or greater, 60 mol % or grater or 70 mol % or greater, based on the total repeating units. The repeating unit represented by formula (9) is preferably in this range as the refractive index will be high. It is also preferably included at a maximum of no greater than 100 mol %, no greater than 90 mol %, no greater than 80 mol %, no greater than 70 mol %, no greater than 60 mol %, no greater than 50 mol % or no greater than 40 mol %, if the repeating unit represented by formula (9) is in this range, it will be easier to obtain a resin with a high refractive index and low Abbe number, as well as low birefringence and balance between heat resistance and moldability.

(Other Repeating Unit)

The thermoplastic resin may also have another repeating unit so long as the properties according to the invention are not impaired. The other repeating unit preferably constitutes less than 30 mol %, 20 mol % or less, 10 mol % or less or 5 mol % or less of the total repeating units.

<Starting Materials for Thermoplastic Resin>

(Diol Component of Formula (1))

The diol component as the starting material of formula (1) for the invention is primarily a diol component represented by formula (a), and a single type may be used alone or two or more different types may be used in combination.

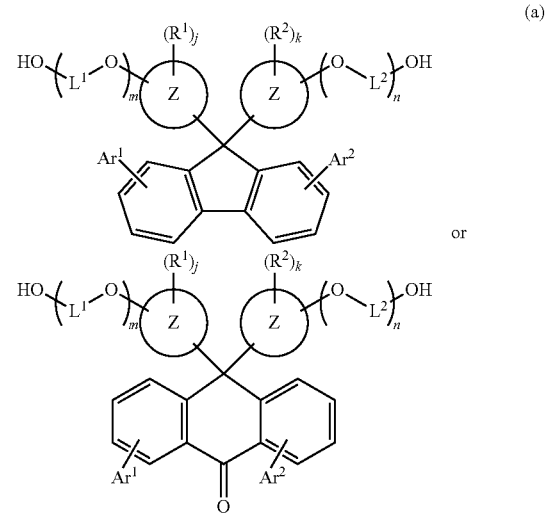

(a)

In formula (a), ring Z, $R^1$, $R^2$, $Ar^1$, $Ar^2$, $L^1$, $L^2$, j, k, m and n are the same as the respective symbols in formula (1). These compounds have two monocyclic aromatic groups of the fluorene backbone or anthrone backbone in a conjugated structure, the conjugated structure being preferred because both $Ar^1$ and $Ar^2$ which are bonded by single bonds to the two monocyclic aromatic groups further form a conjugated structure.

Specific representative examples of diol components represented by formula (a) will now be listed, with the understanding that the starting materials to be used in formula (1) are not limited to these.

When $Ar^1$ and $Ar^2$ are phenyl groups, compounds represented by the following formulas (a1) to (a8) (formula (a1): 9,9-bis(4-(2-hydroxyethoxy)phenyl)-1,8-diphenylfluorene, formula (a2): 9,9-bis(4-(2-hydroxyethoxy)phenyl)-2,7-diphenylfluorene (hereunder also referred to as "BPDP2"), formula (a3): 9,9-bis(4-(2-hydroxyethoxy)phenyl)-3,6-diphenylfluorene, formula (a4): 9,9-bis(4-(2-hydroxyethoxy)phenyl)-4,5-diphenylfluorene, formula (a5): 9,9-bis(4-hydroxyphenyl)-1,8-diphenylfluorene, formula (a6): 9,9-bis(4-hydroxyphenyl)-2,7-diphenylfluorene, formula (a7): 9,9-bis(4-hydroxyphenyl)-3,6-diphenylfluorene and formula (a8): 9,9-bis(4-hydroxyphenyl)-4,5-diphenylfluorene, and their corresponding anthrone compounds) are preferred, with compounds represented by formula (a2): BPDP2 and formula (a6): 9,9-bis(4-hydroxyphenyl)-2,7-diphenylfluorene, and their corresponding anthrone compounds, being particularly preferred.

These may be used alone or in combinations of two or more. Substituents may also be present in the phenyl groups of $Ar^1$ and $Ar^2$.

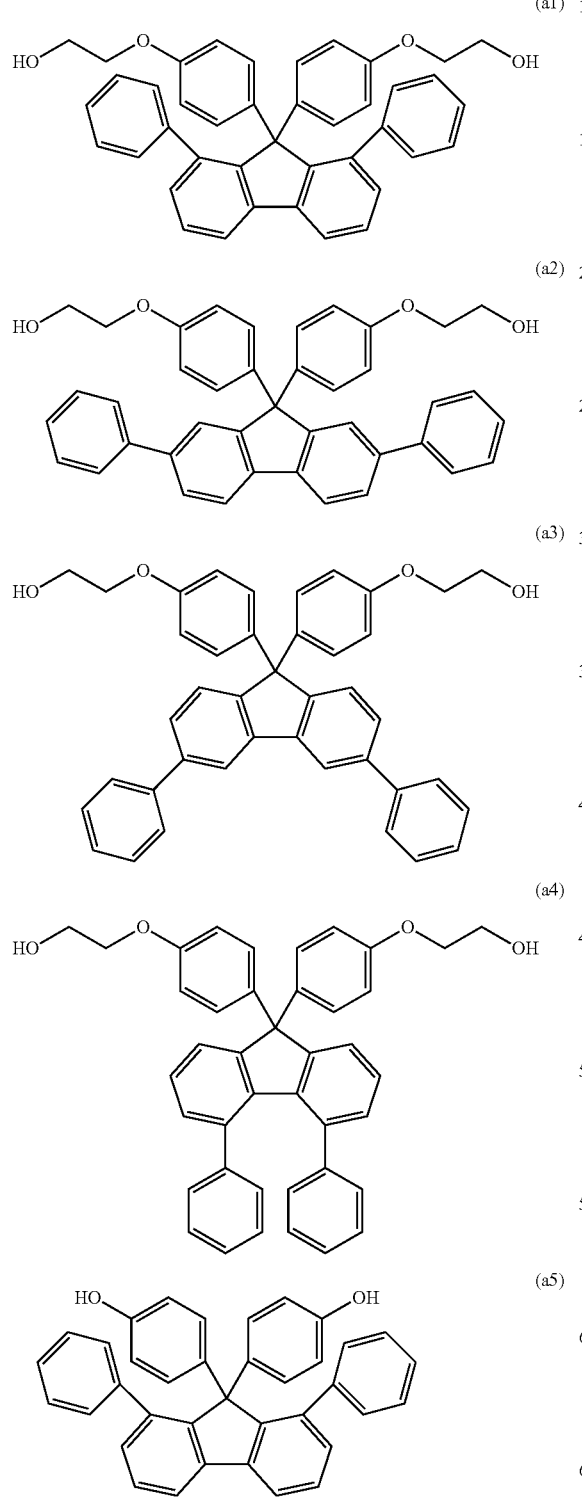

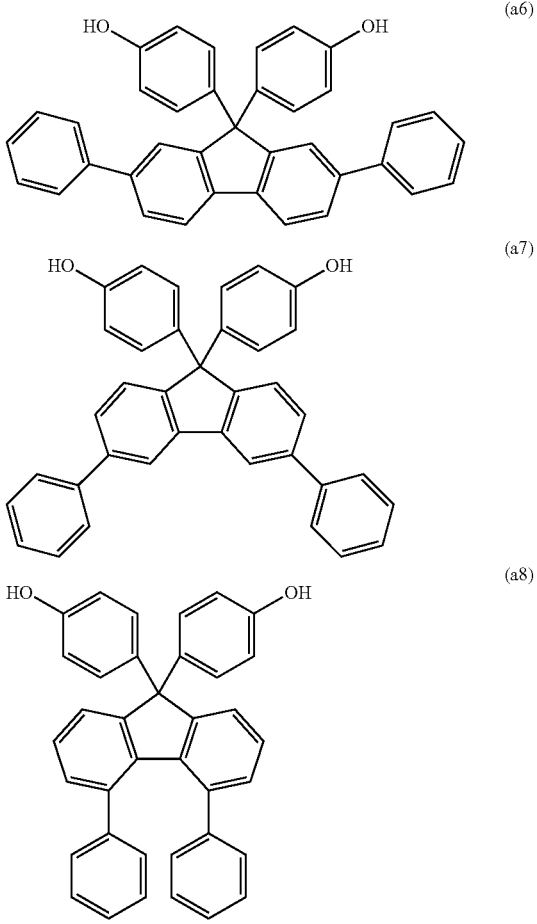

Among the above, structures represented by formula (a2) and formula (a6) are particularly preferred because the resulting structure has more extensive conjugation between the two monocyclic aromatic groups of the fluorene backbone or anthrone backbone and the two monocyclic aromatic groups bonded to them.

When $Ar^1$ and $Ar^2$ are naphthyl groups, compounds represented by the following formula (a9): 9,9-bis(4-(2-hydroxyethoxy)phenyl)-1,8-di(1-naphthyl)fluorene, formula (a10): 9,9-bis(4-(2-hydroxyethoxy)phenyl)-2,7-di(1-naphthyl)fluorene, formula (a11): 9,9-bis(4-(2-hydroxyethoxy)phenyl)-3,6-di(1-naphthyl)fluorene, formula (a12): 9,9-bis(4-(2-hydroxyethoxy)phenyl)-4,5-di(1-naphthyl)fluorene, formula (a13): 9,9-bis(4-hydroxyphenyl)-1,8-di(i-naphthyl)fluorene, formula (a14): 9,9-bis(4-hydroxyphenyl)-2,7-di(1-naphthyl)fluorene, formula (a15): 9,9-bis(4-hydroxyphenyl)-3,6-di(1-naphthyl)fluorene, formula (a16): 9,9-bis(4-hydroxyphenyl)-4,5-di(1-naphthyl)fluorene, formula (a17): 9,9-bis(4-(2-hydroxyethoxy)phenyl)-1,8-di(2-naphthyl)fluorene, formula (a18): 9,9-bis(4-(2-hydroxyethoxy)phenyl)-2,7-di(2-naphthyl)fluorene, formula (a19): 9,9-bis(4-(2-hydroxyethoxy)phenyl)-3,6-di(2-naphthyl)fluorene, formula (a20): 9,9-bis(4-(2-hydroxyethoxy)phenyl)-4,5-di(2-naphthyl)fluorene, formula (a21): 9,9-bis(4-hydroxyphenyl)-1,8-di(2-naphthyl)fluorene, formula (a22): 9,9-bis(4-hydroxyphenyl)-2,7-di(2-naphthyl)fluorene, formula (a23): 9,9-bis(4-hydroxyphenyl)-3,6-di(2-naphthyl)fluorene and formula (a24): 9,9-bis(4-hydroxyphenyl)-4,5-di(2-naphthyl)fluorene, and their corresponding anthrone compounds, are more preferred.

Particularly preferred are compounds represented by formula (a10): 9,9-bis(4-(2-hydroxyethoxy)phenyl)-2,7-di(1-naphthyl)fluorene, formula (a14): 9,9-bis(4-hydroxyphenyl)-2,7-di(1-naphthyl)fluorene, formula (a18): 9,9-bis(4-(2-hydroxyethoxy)phenyl)-2,7-di(2-naphthyl)fluorene (hereunder also referred to as "BPDN2") and formula (a22): 9,9-bis(4-hydroxyphenyl)-2,7-di(2-naphthyl)fluorene, and their corresponding anthrone compounds.

These may be used alone or in combinations of two or more. Substituents may also be present in the naphthyl groups of Ar$^1$ and Ar$^2$.

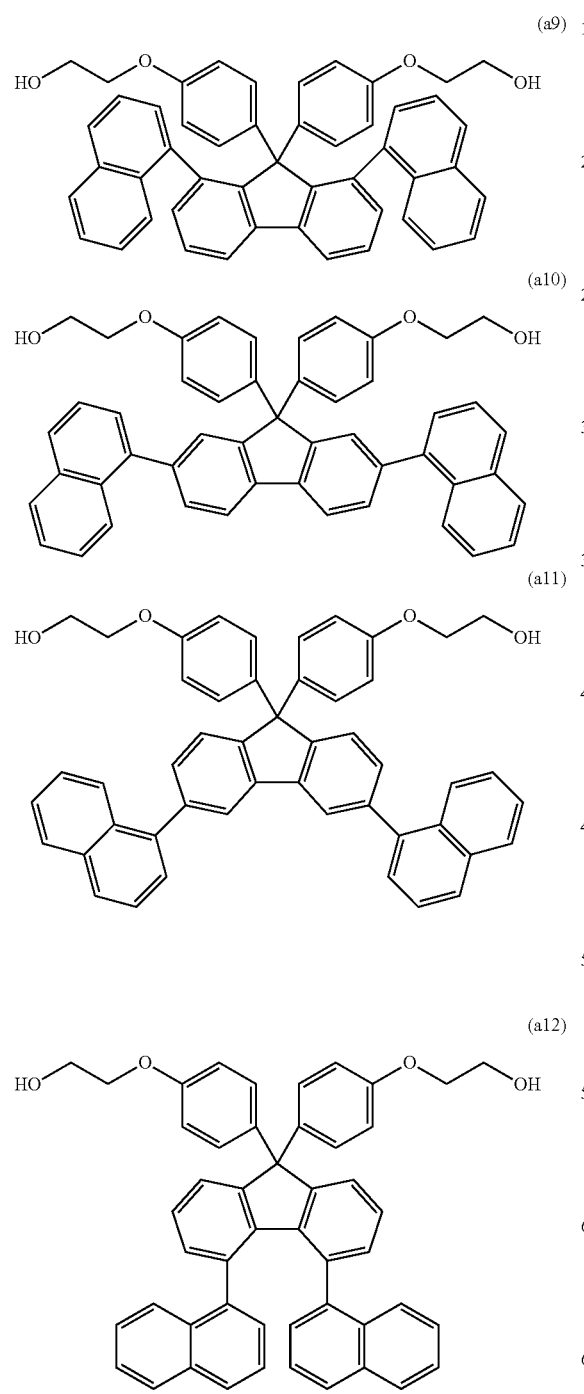

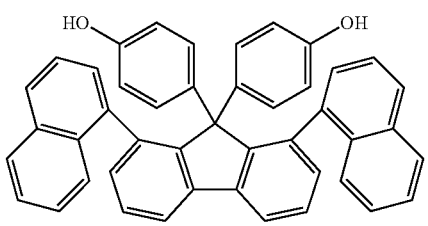

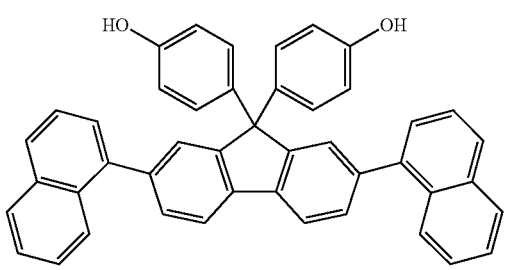

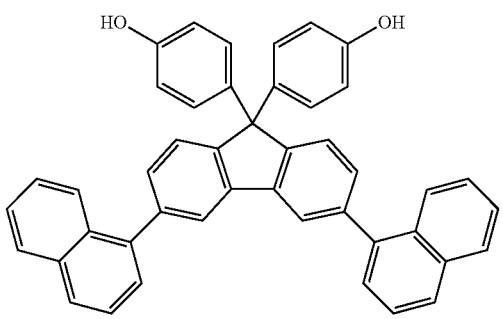

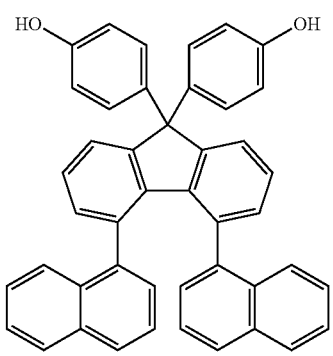

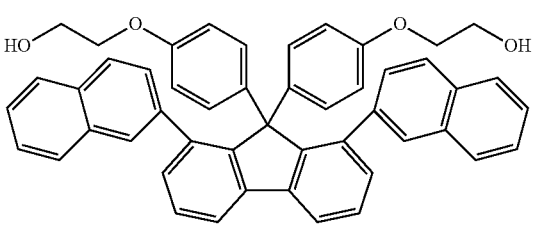

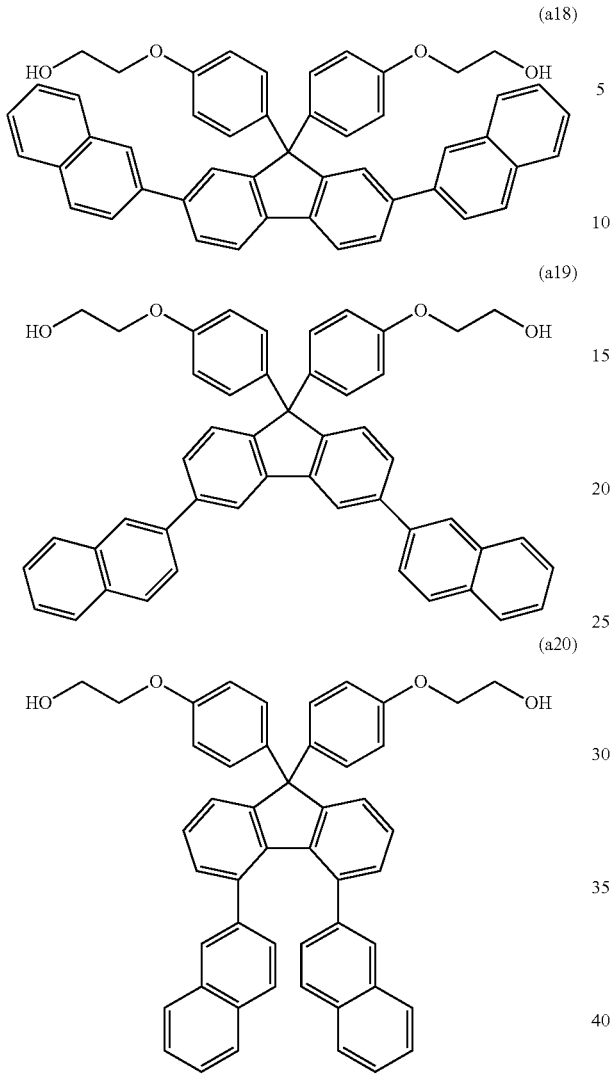

(a18)
(a19)
(a20)
(a21)
(a22)

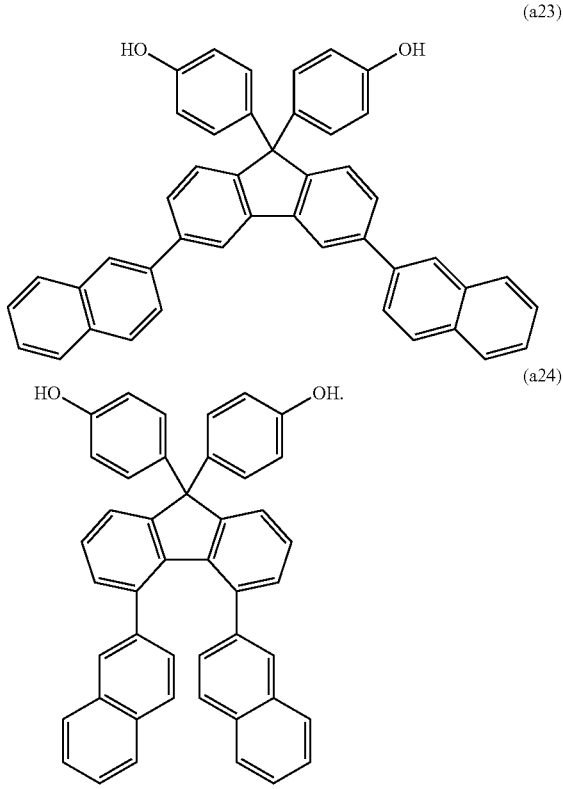

(a23)
(a24)

The structures of formula (a10), formula (a14), formula (a18) and formula (a22), and their corresponding anthrone compounds, are especially preferred because the two monocyclic aromatic groups of the fluorene backbone or anthrone backbone are in a conjugated structure, with the conjugated structure having more extensive conjugation with the two fused polycyclic aromatic groups each bonded by a single bond to the two respective monocyclic aromatic groups.

When $Ar^1$ and $Ar^2$ are heterocyclic aromatic groups, the diol component as formula (a) may be 9,9-bis(4-(2-hydroxyethoxy)phenyl)-2,7-di(2-thienyl)fluorene represented by the following formula (a25), for example:

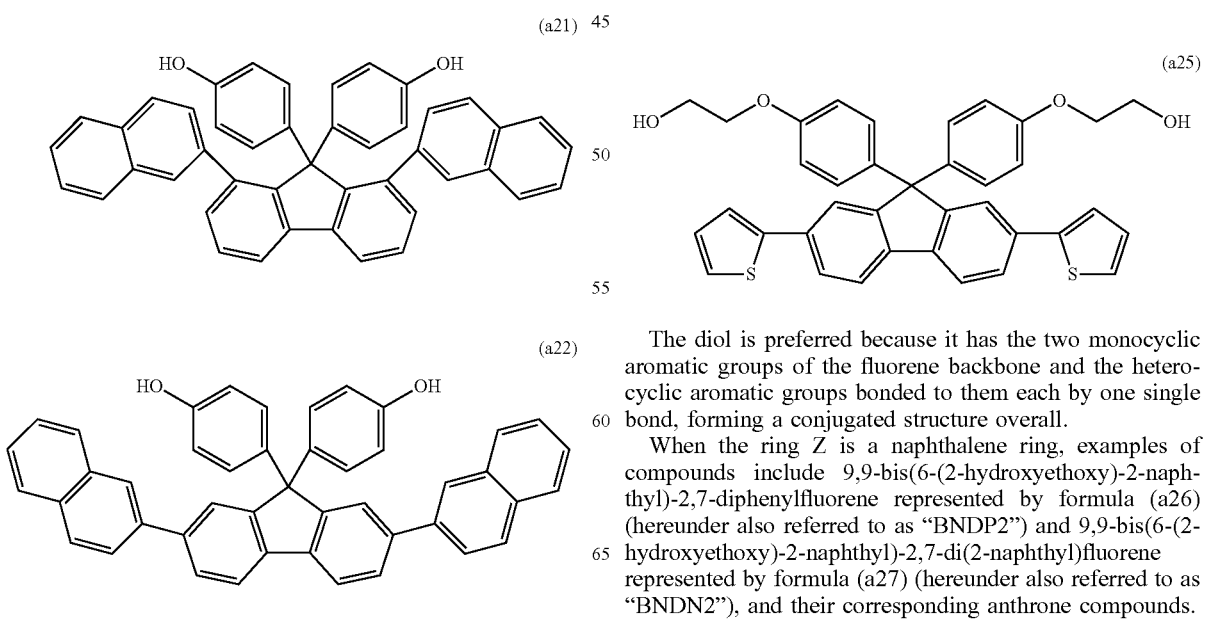

(a25)

The diol is preferred because it has the two monocyclic aromatic groups of the fluorene backbone and the heterocyclic aromatic groups bonded to them each by one single bond, forming a conjugated structure overall.

When the ring Z is a naphthalene ring, examples of compounds include 9,9-bis(6-(2-hydroxyethoxy)-2-naphthyl)-2,7-diphenylfluorene represented by formula (a26) (hereunder also referred to as "BNDP2") and 9,9-bis(6-(2-hydroxyethoxy)-2-naphthyl)-2,7-di(2-naphthyl)fluorene represented by formula (a27) (hereunder also referred to as "BNDN2"), and their corresponding anthrone compounds.

(a26)

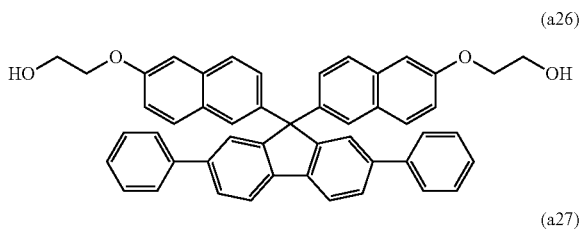

(a27)

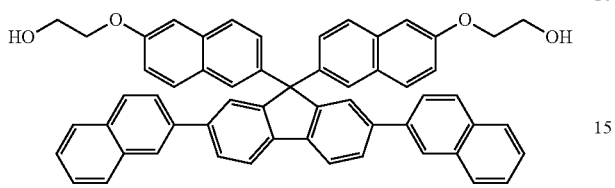

These are preferred because they have the two monocyclic aromatic groups of the fluorene backbone or anthrone backbone and the monocyclic aromatic group or fused polycyclic aromatic group bonded each by one single bond, forming a conjugated structure overall.

(Diol Components of Formulas (6) to (8))

The thermoplastic resin may also have a repeating unit represented by formulas (6) to (8), the following being diol components as starting materials of formulas (6) to (8). These may be used alone or in combinations of two or more.

Diol components as starting materials for formula (6) include 2,2'-bis(2-hydroxyethoxy)-3,3'-dimethyl-1,1'-binaphthalene, 2,2'-bis(2-hydroxyethoxy)-6,6'-dimethyl-1,1'-binaphthalene, 2,2'-bis(2-hydroxyethoxy)-7,7'-dimethyl-1,1'-binaphthalene and 2,2'-bis(2-hydroxyethoxy)-1,1'-binaphthalene.

Examples of diol components as starting materials for formula (7) include 9,9-bis(4-(2-hydroxyethoxy)phenyl) fluorene, 9,9-bis(4-(2-hydroxyethoxy)-3-methylphenyl) fluorene, 9,9-bis(4-(2-hydroxyethoxy)-3-cyclohexylphenyl) fluorene and 9,9-bis(4-(2-hydroxyethoxy)-3-phenylphenyl) fluorene, and their corresponding anthrone compounds, with 9,9-bis(4-(2-hydroxyethoxy)phenyl)fluorene and 9,9-bis(4-(2-hydroxyethoxy)-3-phenylphenyl)fluorene and their corresponding anthrone compounds being particularly preferred. These may be used alone or in combinations of two or more.

Examples of diol components as starting materials of formula (8) include 2,2-bis(4-hydroxyphenyl)propane, 2,2-bis(3-methyl-4-hydroxyphenyl)propane, 1,1-bis(4-hydroxyphenyl)-1-phenylethane, 1,3-bis(2-(4-hydroxyphenyl)-2-propyl)benzene, 1,1-bis(4-hydroxyphenyl)-3,3,5-trimethylcyclohexane, 1,1-bis(4-hydroxyphenyl) cyclohexane, bis(4-hydroxyphenyl)diphenylmethane, 1,1-bis(4-hydroxyphenyl)decane, bis(4-hydroxyphenyl)sulfide, bis(4-hydroxy-3-methylphenyl)sulfide, biphenol, 9,9-bis(4-hydroxyphenyl)fluorene, 9,9-bis(4-hydroxy-3-methylphenyl)fluorene, 9,9-bis(4-hydroxy-3-cyclohexylphenyl)fluorene, 9,9-bis(4-hydroxy-3-phenylphenyl)fluorene, bis(4-hydroxyphenyl)sulfone and 10,10-bis(4-hydroxyphenyl) anthrone, with 2,2-bis(4-hydroxyphenyl)propane and bis(4-hydroxyphenyl)sulfide being particularly preferred. These may be used alone or in combinations of two or more.

(Diol Component of Formula (9))

The diol component as the starting material of formula (9) for the invention is primarily a diol component represented by formula (b), and a single type may be used alone or two or more different types may be used in combination.

(b)

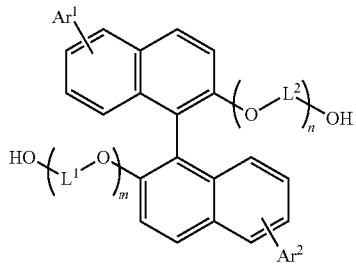

Here, $L^1$, $L^2$, m, n, $Ar^1$ and $Ar^2$ are the same as in formula (1).

When $Ar^1$ and $Ar^2$ are phenyl groups, the diol component of formula (b) may be 2,2'-bis(2-hydroxyethoxy)-3,3'-diphenyl-1,1'-binaphthalene, 2,2'-bis(2-hydroxyethoxy)-6,6'-diphenyl-1,1'-binaphthalene or 2,2'-bis(2-hydroxyethoxy)-7,7'-diphenyl-1,1'-binaphthalene.

The compound 2,2'-bis(2-hydroxyethoxy)-6,6'-diphenyl-1,1'-binaphthalene represented by formula (b)(hereunder also referred to as "BHEB6") is preferred because it will form a conjugated structure between one fused polycyclic aromatic group (naphthyl group) of the binaphthalene backbone and the one monocyclic aromatic group (phenyl group) bonded to it.

(b1)

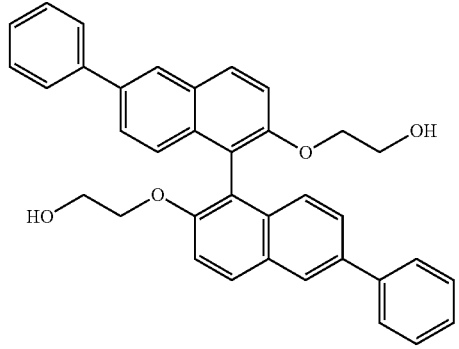

When $Ar^1$ and $Ar^2$ are naphthyl groups, the diol component of formula (b) may be 2,2'-bis(2-hydroxyethoxy)-3,3'-di(2-naphthyl)-1,1'-binaphthalene, 2,2'-bis(2-hydroxyethoxy)-6,6'-di(2-naphthyl)-1,1'-binaphthalene or 2,2'-bis(2-hydroxyethoxy)-7,7'-di(2-naphthyl)-1,1'-binaphthalene.

The compound 2,2'-bis(2-hydroxyethoxy)-6,6'-di(2-naphthyl)-1,1'-binaphthalene represented by formula (b2) is preferred because it will form a conjugated structure between the one fused polycyclic aromatic group (naphthyl group) of the binaphthalene backbone and the one fused polycyclic aromatic group (2-naphthyl group) bonded to it.

(b2)

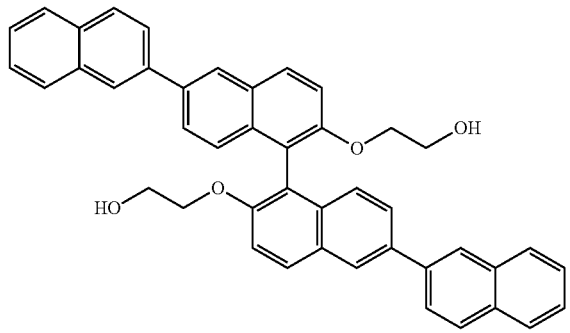

(Other Copolymerizing Component)

The thermoplastic resin may also have copolymerization of another diol component, to an extent that does not impair the properties according to the invention. The other diol component preferably constitutes less than 30 mol %, 20 mol % or less, 10 mol % or less or 5 mol % or less of the total repeating units.

Examples of other diol components to be used in the thermoplastic resin include ethylene glycol, propanediol, butanediol, pentanediol, hexanediol, heptanediol, octanediol, nonanediol, tricyclo[5.2.1.0$^{2,6}$]decanedimethanol, cyclohexane-1,4-dimethanol, decalin-2,6-dimethanol, norbornanedimethanol, pentacyclopentadecanedimethanol, cyclopentane-1,3-dimethanol, spiroglycol, isosorbide, isomannide, isoidide, hydroquinone, resorcinol, bis(4-(2-hydroxyethoxy)phenyl)sulfone, 1,1'-bi-2-naphthol, dihydroxynaphthalene and bis(2-hydroxyethoxy)naphthalene, any of which may be used alone or in combinations of two or more.

(Dicarboxylic Acid Component of Formula (1) or Formula (9))

A dicarboxylic acid component to be used as a unit represented by formula (1) or formula (9) in the thermoplastic resin is primarily preferred to be a dicarboxylic acid represented by HOOC—X—COOH, or an ester-forming derivative thereof. In this formula, X represents a divalent linking group for attachment of a unit represented by formula (1) or formula (9).

Specific typical examples of dicarboxylic acids or their ester-forming derivatives represented by the formula HOOC—X—COOH include compounds of formula (a) or (b) of the invention wherein the diol is a dicarboxylic acid or its ester-forming derivative.

Dicarboxylic acid components to be used in the thermoplastic resin of the invention include aliphatic dicarboxylic acid components such as malonic acid, succinic acid, glutaric acid, adipic acid, pimelic acid, suberic acid, azelaic acid, methylmalonic acid and ethylmalonic acid, monocyclic aromatic dicarboxylic acid components such as phthalic acid, isophthalic acid and terephthalic acid, polycyclic aromatic dicarboxylic acid components such as 2,6-naphthalenedicarboxylic acid, 2,7-naphthalenedicarboxylic acid, 2,3-naphthalenedicarboxylic acid, 1,4-naphthalenedicarboxylic acid, 1,8-naphthalenedicarboxylic acid, anthracenedicarboxylic acid, phenanthrenedicarboxylic acid, 2,2'-bis(carboxymethoxy)-1,1'-binaphthalene, 9,9-bis(carboxymethyl)fluorene, 9,9-bis(2-carboxyethyl)fluorene, 9,9-bis(1-carboxyethyl)fluorene, 9,9-bis(1-carboxypropyl)fluorene, 9,9-bis(2-carboxypropyl)fluorene, 9,9-bis(2-carboxy-1-methylethyl)fluorene, 9,9-bis(2-carboxy-1-methylpropyl)fluorene, 9,9-bis(2-carboxybutyl)fluorene, 9,9-bis(2-carboxy-1-methylbutyl)fluorene, 9,9-bis(5-carboxypentyl)fluorene and 9,9-bis(carboxycyclohexyl)fluorene, biphenyldicarboxylic acid components such as 2,2'-biphenyldicarboxylic acid, and alicyclic dicarboxylic acid components such as 1,4-cyclohexanedicarboxylic acid and 2,6-decalinedicarboxylic acid, with isophthalic acid, terephthalic acid, 2,6-naphthalenedicarboxylic acid and 2,2'-bis(carboxymethoxy)-1,1'-binaphthalene being preferred. These may be used alone or in combinations of two or more. As ester-forming derivatives there may be used acid chlorides, or esters such as methyl ester, ethyl ester or phenyl ester.

The thermoplastic resin of the invention is produced, for example, by a method of reacting a carbonate precursor such as phosgene or a carbonic acid diester with a diol component, or a method of reacting a dicarboxylic acid or its ester-forming derivative with a diol component. Specific examples are listed below.

<Method for Producing Thermoplastic Resin>

The polycarbonate resin, polyester carbonate resin or polyester resin of the invention is produced by commonly known reaction means for producing resins, such as a method of reacting a carbonate precursor such as a carbonic acid diester with a dihydroxy compound, in the case of a polycarbonate. The production method may be carried out with reference to PTL 3, except for using a monomer that provides a repeating unit of formula (a) or (b).

(Method for Producing Polycarbonate)

When the thermoplastic resin is a polycarbonate, it is obtained by a conventionally known method in which a diol component and a carbonate precursor are reacted by interfacial polymerization or melt polymerization. A catalyst, end terminator, antioxidant or the like may also be used as necessary during production of the polycarbonate.

(Method for Producing Polyester)

When the thermoplastic resin is a polyester, the diol component and the dicarboxylic acid or its ester-forming derivative may be reacted by esterification or transesterification reaction, and the obtained reaction product may be subjected to polycondensation reaction to form a polymer of the desired molecular weight. This method may also employ a known protocol.

(Method for Producing Polyester Carbonate)

When the thermoplastic resin is a polyester carbonate, it may be produced by reacting a diol component and a dicarboxylic acid or its ester-forming derivative, with phosgene or a carbonate precursor such as a carbonic acid diester. The polymerization method used may be the same known method as used for a polycarbonate or polyester.

<Thermoplastic Resin—Impurities>

(Residual Phenol)

The residual phenol content of the thermoplastic resin is preferably 1 to 500 ppm, more preferably 1 to 400 ppm and even more preferably 1 to 300 ppm. The phenol content is preferably adjusted by the reaction time at a pressure of below 1.3 kPa. The phenol content increases when reaction is not conducted at a degree of vacuum of below 1.3 kPa. If the reaction time is too long, too much will tend to distill off from the resin.

The phenol content can be adjusted after the thermoplastic resin has been obtained. For example, it is possible to use a method of dissolving the thermoplastic resin in an organic solvent and rinsing the organic solvent layer with water, or a method of using a commonly used single-screw or twin-screw extruder or a kneading machine such as any of various types of kneaders, for devolatilization at a pressure of 133 to 13.3 Pa and a temperature of 200 to 320° C. With a suitable residual phenol content, it is possible to increase the molding fluidity without loss of heat resistance. In addition, the thermal stability during hot melting of the resin is also satisfactory, and die contamination during injection molding of the resin can also be prevented. Furthermore, while phenols tend to undergo coloration when oxidized, the color tone of the thermoplastic resin is less likely to be impaired and the molding fluidity is also satisfactory within this range.

(Residual Fluorenone)

The residual fluorenone content of the thermoplastic resin is preferably 1 to 500 ppm, more preferably 1 to 300 ppm, even more preferably 1 to 100 ppm and most preferably 1 to 50 ppm. If the residual fluorenone content in the thermoplastic resin is suitable it will be possible to prevent coloration of the resin.

Fluorenone is used as a starting material for production of monomers with fluorene-based units, and it remains if not completely removed during the production process. The present inventors have found that the residual amount of fluorenone is connected with coloration of the thermoplastic resin.

(Residual Palladium (Pd))

The thermoplastic resin preferably includes no palladium. The amount of residual palladium in the thermoplastic resin is preferably no greater than 10 ppm, and more preferably no greater than 5.0 ppm, no greater than 3.0 ppm, no greater than 1.0 ppm or 0.5 ppm, but it may be 0.0 ppm or greater, 0.1 ppm or greater, 0.2 ppm or greater or 0.5 ppm or greater. If the amount of residual palladium in the thermoplastic resin is suitable it will be possible to prevent coloration of the resin.

Palladium catalysts are used as catalysts for bonding aromatic substituents to fluorene-based component units or anthrone-based component units, or binaphthalene-based component units, and they commonly remain in thermoplastic resins that contain fluorene-based component units or anthrone-based component units that include aromatic substituents on side chains, and/or binaphthalene-based component units that include aromatic substituents. The present inventors have found that the residual amount of palladium catalyst is connected with coloration of a thermoplastic resin. In order to lower the amount of residual palladium in a resin, an appropriate palladium catalyst type may be selected, or the palladium catalyst residue-containing monomer and/or resin may be subjected to palladium removal treatment.

<Additives>

The thermoplastic resin composition for formation of an optical lens of the invention may also have addition of appropriate additives such as release agents, heat stabilizers, ultraviolet absorbers, blueing agents, antistatic agents, flame retardants, plasticizers and fillers as necessary, in addition to the thermoplastic resin.

Specific release agents and heat stabilizers that are preferred include those mentioned in International Patent Publication No. 2011/010741.

Particularly preferred release agents include stearic acid monoglyceride, stearic acid triglyceride, pentaerythritol tetrastearate, and mixtures of stearic acid triglyceride and stearyl stearate. The amount of ester in the release agent is preferably 90 mass % or greater and more preferably 95 mass % or greater, with 100 mass % as the amount of release agent. The release agent is added to the thermoplastic resin composition preferably in the range of 0.005 to 2.0 parts by mass, more preferably in the range of 0.01 to 0.6 part by mass and even more preferably in the range of 0.02 to 0.5 part by mass, with respect to 100 parts by mass of the thermoplastic resin.

Heat stabilizers include phosphorus-based heat stabilizers, sulfur-based heat stabilizers and hindered phenol-based heat stabilizers.

Particularly preferred phosphorus-based heat stabilizers for use are tris(2,4-di-tert-butylphenyl)phosphite, bis(2,6-di-tert-butyl-4-methylphenyl)pentaerythritol diphosphite and tetrakis(2,4-di-tert-butylphenyl)-4,4'-biphenylene diphosphonite. The content of the phosphorus-based heat stabilizer in the thermoplastic resin is preferably 0.001 to 0.2 part by mass with respect to 100 parts by mass of the thermoplastic resin.

A particularly preferred sulfur-based heat stabilizer is pentaerythritol-tetrakis(3-laurylthiopropionate). The content of a sulfur-based heat stabilizer in the thermoplastic resin is preferably 0.001 to 0.2 part by mass with respect to 100 parts by mass of the thermoplastic resin.

Preferred hindered phenol-based heat stabilizers are octadecyl-3-(3,5-di-tert-butyl-4-hydroxyphenyl)propionate and pentaerythritol-tetrakis[3-(3,5-di-tert-butyl-4-hydroxyphenyl)propionate].

The content of a hindered phenol-based heat stabilizer in the thermoplastic resin is preferably 0.001 to 0.3 part by mass with respect to 100 parts by mass of the thermoplastic resin.

A phosphorus-based heat stabilizer and a hindered phenol-based heat stabilizer may also be used in combination.

The ultraviolet absorber is preferably at least one type of ultraviolet absorber selected from the group consisting of benzotriazole-based ultraviolet absorbers, benzophenone-based ultraviolet absorbers, triazine-based ultraviolet absorbers, cyclic imino ester-based ultraviolet absorbers and cyanoacrylate-based compounds.

More preferred benzotriazole-based ultraviolet absorbers are 2-(2-hydroxy-5-tert-octylphenyl)benzotriazole and 2,2'-methylenebis[4-(1,1,3,3-tetramethylbutyl)-6-(2H-benzotriazol-2-yl)phenol].

Benzophenone-based ultraviolet absorbers include 2-hydroxy-4-n-dodecyloxybenzophenone and 2-hydroxy-4-methoxy-2'-carboxybenzophenone.

Triazine-based ultraviolet absorbers include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

A particularly suitable cyclic imino ester-based ultraviolet absorber is 2,2'-p-phenylenebis(3,1-benzoxazin-4-one).

Cyanoacrylate-based ultraviolet absorbers include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The content of the ultraviolet absorber is preferably 0.01 to 3.0 parts by mass with respect to 100 parts by mass of the thermoplastic resin, as a content within this range can impart sufficient weather resistance to the thermoplastic resin molded article, according to the purpose of use.

Blueing agents include MACROLEX Violet B and MACROLEX Blue RR by Bayer Ltd., and Polysynthren Blue RLS by Clariant Japan. A blueing agent is effective for eliminating yellowishness of the thermoplastic resin. Particularly in the case of a thermoplastic resin composition that has been given weather resistance, addition of an ultraviolet absorber in a fixed amount currently tends to produce a yellowish color in the resin composition by the "action and color of the ultraviolet absorber", and therefore addition of a blueing agent is highly effective for imparting natural transparency to lenses.

The blueing agent content is preferably 0.05 to 1.5 ppm and more preferably 0.1 to 1.2 ppm with respect to 100 parts by mass of the thermoplastic resin.

<Molding Method>

When an optical lens of the invention is to be produced by injection molding, molding is preferably carried out under conditions with a cylinder temperature of 230 to 350° C. and a mold temperature of 70 to 180° C. More preferably, molding is carried out under conditions with a cylinder temperature of 250 to 300° C. and a mold temperature of 80 to 170° C. When the cylinder temperature is higher than 350° C. the thermoplastic resin tends to decompose and undergo coloration, and when it is lower than 230° C. the melt viscosity increases, tending to hamper molding. Also, when the mold temperature is higher than 180° C., it tends to become difficult to remove molded pieces composed of the thermoplastic resin from the die. When the mold temperature is below 70° C., on the other hand, the resin hardens too quickly inside the die during molding, making it difficult for the molded piece shape to be controlled and tending to make it difficult for the mold shape of the die to be transferred.

It is preferred to use an aspherical lens shape, as necessary, for an optical lens of the invention. An aspherical lens allows spherical aberration to be reduced to essentially zero with a single lens, thus making it unnecessary to eliminate spherical aberration by a combination of multiple spherical lenses, and allowing the weight to be reduced and the molding cost to be reduced. Therefore, an aspherical lens is useful among optical lenses, particularly as a camera lens.

Specifically, the lens size is such that the center section thickness is 0.05 to 3.0 mm, more preferably 0.05 to 2.0 mm and even more preferably 0.1 to 2.0 mm. The diameter is 1.0 mm to 20.0 mm, more preferably 1.0 to 10.0 mm and more preferably 3.0 to 10.0 mm. A meniscus lens is preferred, having a shape which is convex on one side and concave on the other side.

An optical lens of the invention is molded by any desired method such as die molding, shaving, polishing, laser working, electrical discharge machining or etching. Die molding is more preferred among these, from the viewpoint of production cost.

EXAMPLES

The invention will now be described in greater detail by examples, with the understanding that they are not restrictive on the invention.

<Evaluation Methods>
<Refractive Index and Abbe Number>

After dissolving 3 g of an obtained resin in 50 ml of methylene chloride, the solution was cast onto a glass dish. After thoroughly drying at room temperature, it was dried for 8 hours at a temperature of 120° C. or below to prepare a film with a thickness of approximately 100 μm. The refractive index at 25° C. (wavelength: 589 nm) and the Abbe number (calculated from the refractive index at wavelengths of 486 nm, 589 nm and 656 nm, using the following formula) of the film were measured using a DR-M2 Abbe refractometer by Atago.

$$\nu=(nD-1)/(nF-nC)$$

The following definitions are used for the purpose of the invention:

nD: refractive index at 589 nm wavelength,
nC: refractive index at 656 nm wavelength,
nF: refractive index at 486 nm wavelength.

<Solution b* Value>

After dissolving 1 g of the obtained resin in 5 ml of methylene chloride, the CIE1976 (L*a*b*) color system value of the solution was measured using a U-3310 spectrophotometer by Hitachi, Ltd.

<Measurement of ICP-OES>

The amount of metal component in the resins obtained in the Examples were measured with the following apparatus. Device: Agilent 5100 ICP-OES by Agilent Technologies, Inc.

Production Examples

Synthesis of diol of formula (a)

Figure 2:
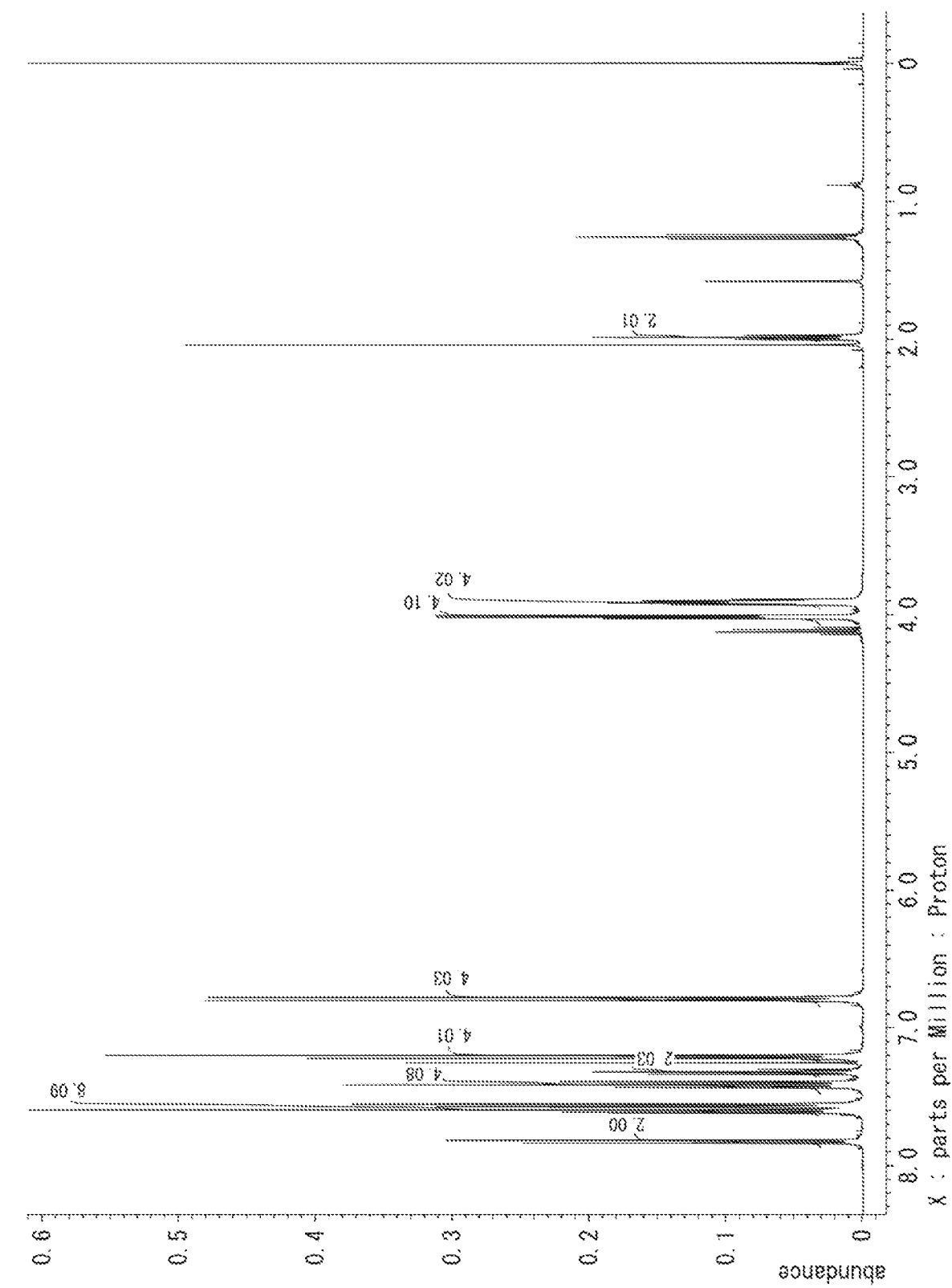
FIG. 2 shows $^1$H NMR results for BPDP2 (9,9-bis(4-(2-hydroxyethoxy)phenyl)-2,7-diphenylfluorene).

The fusing component and the boronic acid component were changed as listed in Table 1 for production of the diols of formula (a) listed in Table 1. The synthesis methods A to 1) described below were used for production of the diols. FIG. 2 shows the 1H NMR spectrum for BPDP2.

TABLE 1

| Diol of formula (a) | Condensation component | Boronic acid component |
| --- | --- | --- |
| BPDP2 | phenoxyethanol | phenylboronic acid |
| BNDP2 | 2-naphthoxyethanol | phenylboronic acid |
| BPDN2 | phenoxyethanol | 2-naphthaleneboronic acid |
| BNDN2 | 2-naphthoxyethanol | 2-naphthaleneboronic acid |

Synthesis Method A: Synthesis Method Using PL Catalyst

<PL Catalyst>

The PL catalyst was a powdered solid catalyst having palladium supported on silica, by N.E. Chemcat Corp., and is abbreviated as $Pd/SiO_2$. This catalyst is specialized for Suzuki coupling reaction, and it promotes more ligand-free reaction for bromoaryl substrates than a homogeneous palladium catalyst. It is also often supported on silica, in which case there is low elution of Pd into products after reaction.

<Step A-1>

After charging 150 g of toluene as a solvent and 2.19 g of 12-phosphotungstic (V1) acid n-hydrate ($H_3[PW_{12}O_{40}]$·$nH_2O$) into a 500 mL flask equipped with a stirrer, cooler and thermometer, azeotropic dehydration was carried out with toluene circulation. After cooling the contents, 33.8 g (0.10 mol) of 2,7-dibromofluorenone (hereunder also abbreviated as DBFN) and 1.0 mol of a fusing component of Table 1 selected for the target diol were added, and the mixture was stirred while circulating toluene and discharging the reaction-produced water out of the system.

Progression of the reaction was confirmed by appropriate HPLC, and completion of the reaction was confirmed when the peak area of DBFN fell to or below 0.1% of the total peak area. After adding 150 g of toluene to the obtained reaction mixture, it was rinsed 3 times with 300 g of water. After rinsing, the organic layer was subjected to activated carbon treatment and concentrated under reduced pressure to distill off the toluene solvent and excess fusing component. The obtained mixture was recrystallized from methanol and the precipitated crystals were filtered, collected and dried to obtain faint yellow crystals of the target intermediate product (fused reaction product of DBFN and fusing component).

<Step A-2>

After charging 0.03 mol of the target intermediate product obtained in step A-1, 0.066 mol of a boronic acid component of Table 1 selected for the target diol, 0.2 g of a PL catalyst by N.E. Chemcat Corp. (Pd-equivalent value: 200 ppm), 150 g of toluene and 35 mL of a 2 M aqueous potassium carbonate solution into a 500 mL flask equipped with a stirrer, cooler and thermometer, the mixture was stirred at 80° C. for reaction. Progression of the reaction was confirmed by appropriate HPLC, and completion of the reaction was confirmed when the peak area of the target intermediate product fell to or below 0.1% of the total peak area. After cooling the obtained reaction mixture to room temperature, chloroform was added to completely dissolve the reaction product, and the solid from the palladium compound was filtered and collected. The collected filtrate was rinsed 3 times with water, concentrated and recrystallized with ethyl acetate/hexane to obtain white crystals of the final target product. When the residual metal content was measured by ICP-OES, Pd was in the range of 3.0 to 5.0 ppm for all of the diols.

Synthesis Method B: Synthesis Method Using Catalyst Containing 100 ppm Pd

<Step B-1>

After charging 150 g of toluene as a solvent and 2.19 g of 12-phosphotungstic (V1) acid n-hydrate ($H_3[PW_{12}O_{40}]\cdot nH_2O$) into a 500 mL flask equipped with a stirrer, cooler and thermometer, azeotropic dehydration was carried out with toluene circulation. After cooling the contents, 0.10 mol of DBFN and 0.40 mol of a fusing component of Table 1 selected for the target diol were added, and the mixture was stirred while circulating toluene and discharging the reaction-produced water out of the system.

Progression of the reaction was confirmed by appropriate HPLC, and completion of the reaction was confirmed when the peak area of DBFN fell to or below 0.1% of the total peak area. The obtained target intermediate product was used directly in the reaction of the following step B-2 without isolation or purification.

<Step B-2>

After cooling the reaction mixture obtained in step B-1 to room temperature, there were added 58 mL of a 4 M aqueous potassium carbonate solution, 0.21 mol of the boronic acid component in Table 1 selected for the target diol, and tetrakis(triphenylphosphine)palladium to a palladium content of 100 ppm, and the mixture was stirred at 80° C. for reaction. Progression of the reaction was confirmed by appropriate HPLC, and completion of the reaction was confirmed when the peak area of the target intermediate product fell to or below 0.1% of the total peak area. The obtained reaction mixture was cooled to room temperature, and after adding ethanol to produce crystallization, the solid was filtered and collected. The collected solid was dissolved in chloroform and rinsed 3 times with hot water, after which the chloroform layer was subjected to decoloration treatment with active carbon and treated for palladium removal, and subsequently concentrated to obtain a partially purified product. The obtained solid partially purified product was recrystallized from toluene to obtain the final target product as white crystals. When the residual metal content was measured by ICP-OES, Pd was in the range of 15.0 to 20.0 ppm for all of the diols.

Synthesis Method C: Synthesis Method Using Catalyst Containing 30 ppm Pd

A final target product was obtained as white crystals by the same method as the step B group, except that tetrakis (triphenylphosphine)palladium was added to a palladium content of 30 ppm. When the residual metal content was measured by ICP-OES, Pd was in the range of 8.0 to 10.0 ppm for all of the diols.

Synthesis Method D: Synthesis Method Using Catalyst Containing 100 ppm Pd, And without Pd Removal Treatment A final target product was obtained as a faint yellow solid in the same manner as the step B group, except that Pd removal treatment was not carried out. When the residual metal content was measured by ICP-OES, Pd was in the range of 70.0 to 80 ppm for all of the diols.

Synthesis of Diol of Formula (b)

The compound BHEB6 (2,2-bis(2-hydroxyethoxy)-6,6'-diphenyl-1,1'-binaphthalene), as a diol of formula (b), was synthesized by the following synthesis method.

After charging 5.0 g (11.3 millimole) of the commercial product 6,6'-dibromo-1,1'-bi-2-naphthol (hereunder also abbreviated as BN-6Br), 2.3 g (25.9 millimole) of ethylene carbonate, 0.16 g (1.9 millimole) of potassium carbonate and 15 g of toluene into a flask equipped with a stirrer, cooler and thermometer, reaction was conducted at 110° C. for 5 hours. Progression of the reaction was confirmed by appropriate HPLC, and completion of the reaction was confirmed when the peak area of BN-6Br fell to or below 0.1% of the total peak area. After then adding 65 g of toluene to the obtained reaction mixture for dilution, 8 g of a 10 mass % aqueous sodium hydroxide solution was added, the mixture was stirred at 85° C. for 1 hour and the aqueous layer was removed by separatory funnel. After concentrating the organic layer, it was dissolved in ethyl acetate and rinsed, and the aqueous layer was removed by separatory funnel. As a result of further addition of hexane and direct recrystallization, the target compound 2,2'-bis(2-hydroxyethoxy)-6,6'-dibromo-1,1'-binaphthalene (hereunder also abbreviated as BHEB-6Br) was obtained as a white solid.

After charging 3.5 g (6.6 millimole) of BHEB-6Br, 2.1 g (16.5 millimole) of phenylboronic acid, 0.112 g (0.1 millimole, about 2100 ppm in terms of Pd) of tetrakis(triphenylphosphine)palladium, 9 mL of a 2 M aqueous potassium carbonate solution, 33 mL of toluene and 12 mL of ethanol into a flask equipped with a stirrer, cooler and thermometer under a nitrogen atmosphere, reaction was conducted at 80° C. for 2 hours. Progression of the reaction was confirmed by appropriate HPLC, and completion of the reaction was confirmed when the peak area of BHEB-6Br fell to or below 0.10% of the total peak area. After concentrating the obtained reaction mixture, a 1 M aqueous sodium hydroxide solution was added and extraction was performed with chloroform. Active carbon was added to the obtained organic layer and the mixture was stirred for 1 hour, after which the active carbon was filtered out and the organic layer was concentrated. After concentration it was purified by silica gel column chromatography to obtain 2.6 g of the target compound BHEB6 as white crystals (75% yield, 99.2% purity). Measurement of the residual metals by ICP-OES showed Pd at 7.0 ppm.

Synthesis of Other Diols

Synthesis of BNF
(9,9-bis(6-hydroxy-2-naphthyl)fluorene)

After charging 340 g of toluene as a solvent and 2.94 g of 12-phosphotungstic (V1) acid n-hydrate ($H_3[PW_{12}O_{40}]\cdot nH_2O$) into a 3 L three-necked flask equipped with a stirrer, cooler and thermometer, azeotropic dehydration was carried out for 30 minutes with toluene circulation. After cooling the contents, 54.1 g (0.3 mol) of fluorenone, 173 g (1.2 mol) of 2-naphthol and 50 g of toluene were added, and the mixture was stirred with toluene circulation while the water generated by the reaction was discharged out of the system.

Progression of the reaction was confirmed by appropriate HPLC, and the end point of the reaction was confirmed when the peak area of fluorenone fell to or below 0.1% of the total peak area. The obtained reaction mixture was adjusted to 70° C. and rinsed 3 times with 200 g of water, after which the aqueous layer was removed. Toluene was added to the organic layer, decoloration was carried out with active carbon, diisopropyl ether was added to the treatment solution and the mixture was stirred at 60° C. for 1 hour, after which it was cooled to 10° C. for recrystallization to obtain the target compound 9,9-bis(6-hydroxy-2-naphthyl) fluorene (hereunder also abbreviated as BNF).

The diols and dicarboxylic acids other than those mentioned above which were used in the Examples were either commercial products or were produced by publicly known methods.

Example 1

After placing 100 mol (59.03 parts by mass) of the synthesized BPDP2, 101 mol (21.64 parts by mass) of diphenyl carbonate (hereunder also abbreviated as DPC) and $42.0 \times 10^{-5}$ parts by mass of sodium hydrogencarbonate in a jacketed reaction vessel equipped with a stirrer and distillation device, nitrogen exchange was carried out 3 times, and the jacket was heated to 180° C. to melt the starting materials. After complete dissolution, the pressure was reduced to 20 kPa over a period of 5 minutes while simultaneously increasing the temperature of the jacket to 260° C. at a rate of 60° C./hr, for transesterification reaction. The jacket was then kept at 260° C. while reducing the pressure to 0.13 kPa over a period of 50 minutes, and polymerization reaction was carried out under conditions of 260° C., ≤0.13 kPa until a predetermined torque of the stirrer was reached. Upon completion of the reaction, the produced resin was extruded while being pelletized, to obtain polycarbonate resin pellets. The properties of the obtained polycarbonate resin are shown in Table 2.

After drying the obtained resin at 120° C. for 4 hours, 0.05 mass % of bis(2,6-di-tert-butyl-4-methylphenyl)pentaerythritol diphosphite and 0.10 mass % of glycerin monostearate were added, based on the mass of the resin, and a vented φ15 mm twin-screw extruder was used for pelletizing. After drying the pellets at 120° C. for 4 hours, they were subjected to injection molding at a cylinder temperature of 280° C. and a mold temperature of 130° C., to obtain an optical lens with a thickness of 0.3 mm, a convex curvature radius of 5 mm and a concave curvature radius of 4 mm.

Examples 2 to 9 and Comparative Examples 1 to 4

Polycarbonate resin pellets and optical lenses were obtained for Examples 2 to 9 and Comparative Examples 1 to 4, changing the composition of Example 1 as shown in Table 2. The molar ratio of the diol and DPC was 1:1.01 for these examples.

Example 10

After placing 8.85 parts by mass of BPDP2, 12.64 parts by mass of BHEB, 10.56 parts by mass of BCMB (2,2'-bis (carboxymethoxy)-1,1'-binaphthalene), 5.30 parts by mass of DPC, and $38.9 \times 10^{-3}$ parts by mass of aluminum acetylacetonate and $85.4 \times 10^{-3}$ parts by mass of diethyl 3,5-di-tert-butyl-4-hydroxybenzylphosphonate as polymerization catalysts in a jacketed reaction vessel equipped with a stirrer and distillation device, nitrogen exchange was carried out 3 times, and the jacket was heated to 180° C. to melt the starting materials. The pressure was then reduced to 40 kPa over a period of 20 minutes while simultaneously increasing the temperature of the jacket to 260° C. at a rate of 60° C./hr, for transesterification reaction. The pressure was then lowered to 0.13 kPa over a period of 70 minutes, and polymerization reaction was carried out under conditions of 0.13 kPa until a predetermined torque of the stirrer was reached. Upon completion of the reaction, the produced resin was extruded while being pelletized, to obtain polyester carbonate resin pellets. The total of the diol components (BPDP2, BHEB) introduced into the polyester carbonate resin was 65 mol % with respect to the total monomer components (total diol component+total dicarboxylic acid component), and the total of the carboxylic acid component introduced into the polyester carbonate resin was 35 mol % with respect to the total monomer components (total diol component+total dicarboxylic acid component). The properties of the obtained polyester carbonate resin are shown in Table 3.

After drying the obtained resin at 120° C. for 4 hours, 0.05 mass % of bis(2,6-di-tert-butyl-4-methylphenyl)pentaerythritol diphosphite and 0.10 mass % of glycerin monostearate were added, based on the mass of the resin, and a vented φ15 mm twin-screw extruder was used for pelletizing. After drying the pellets at 120° C. for 4 hours, they were subjected to injection molding at a cylinder temperature of 280° C. and a mold temperature of 130° C., to obtain a lens with a thickness of 0.3 mm, a convex curvature radius of 5 mm and a concave curvature radius of 4 mm.

Examples 11 and 12 and Comparative Example 8

Polyester carbonate resin pellets and optical lenses were obtained for Examples 11 and 12 and Comparative Example 8, changing the composition of Example 10 as shown in Table 3.

Example 13 and Comparative Examples 5, 6 and 7

Polyester carbonate resin or polyester resin pellets and optical lenses were obtained for Example 13 and Comparative Examples 5, 6 and 7, changing the composition of Example 10 as shown in Table 3, and changing the polymerization catalyst to $1.70 \times 10$ parts by mass of titanium tetrabutoxide.

Results

Figure 3:
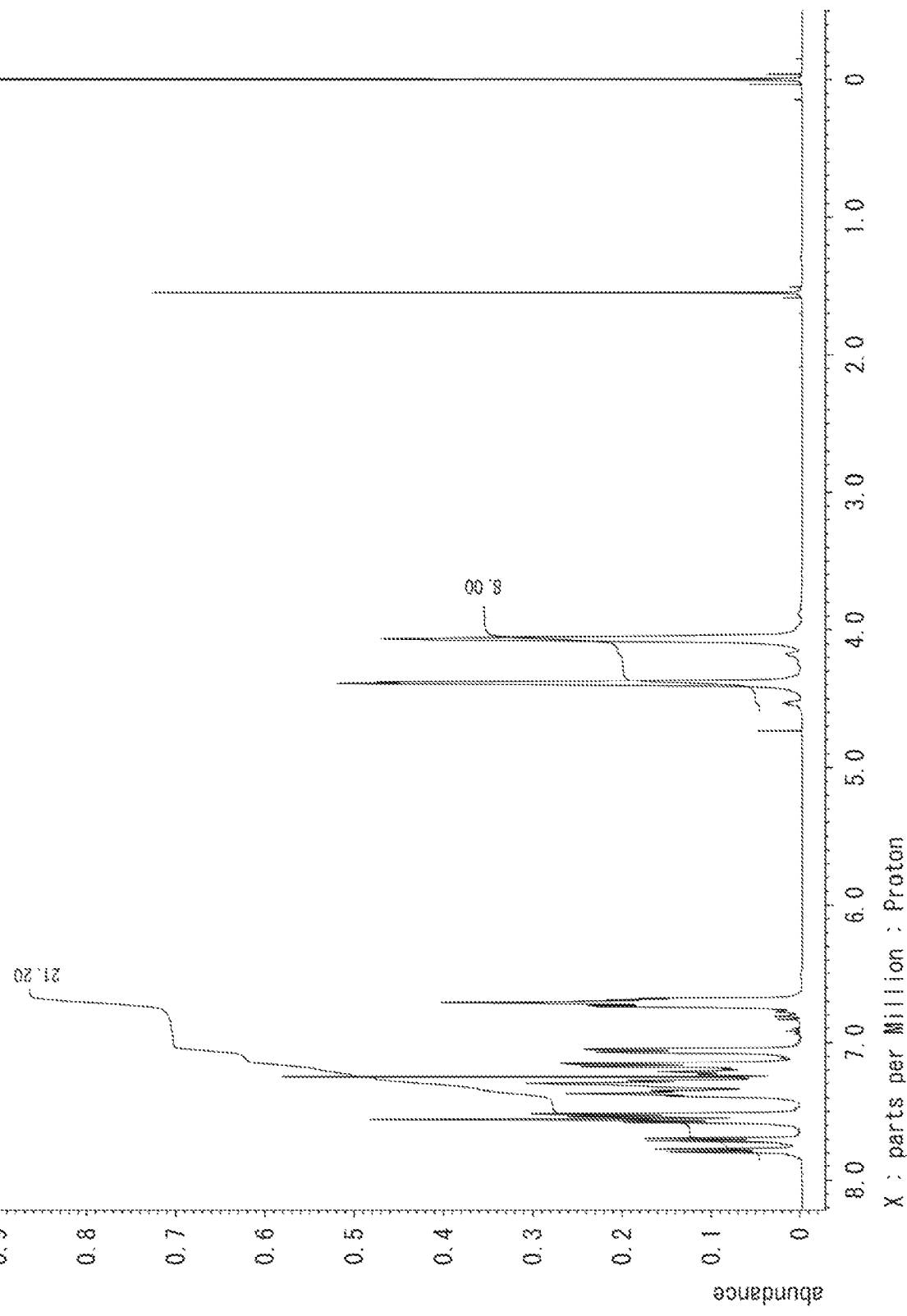
FIG. 3 shows the $^1$H NMR results for the polycarbonate resin obtained in Example 4.
Figure 4:
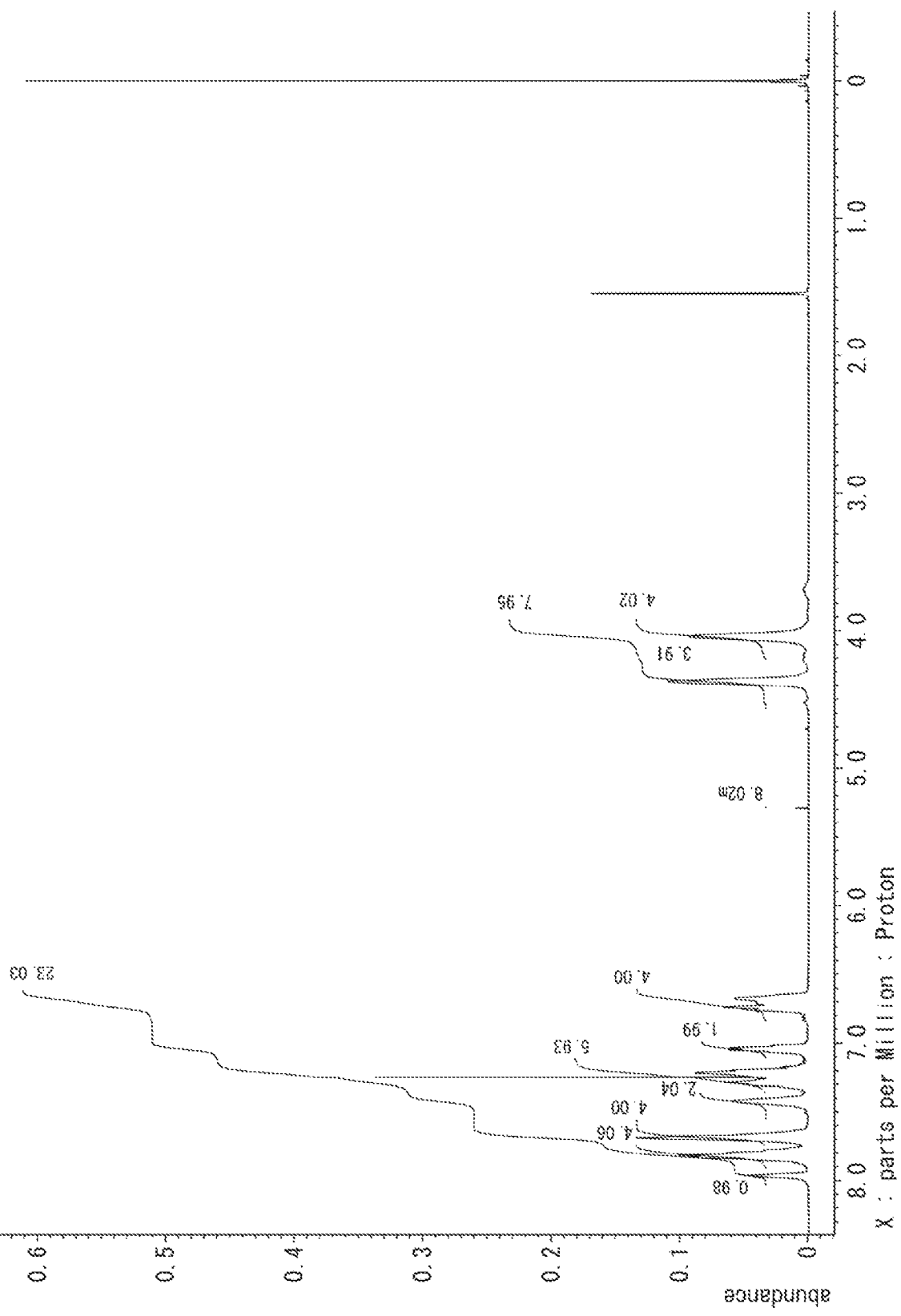
FIG. 4 shows the $^1$H NMR results for the polycarbonate resin obtained in Example 5.

The evaluation results for the polycarbonate resin examples are shown in Table 2. The $^1$H NMR results for Example 4 and Example 5 are shown in FIG. 3 and FIG. 4, respectively. The polymer obtained in Comparative Example 4 had strong coloration due to the palladium catalyst, and lower transmittance in the short wavelength range, making it difficult to calculate the Abbe number.

Table 3 shows the evaluation results for the polyester carbonate resin and polyester resin examples.

TABLE 2

| | Polycarbonate compositional ratio [mol %] | | | | | | | | | | | Synthesis method for diol of formula (a) | Pd residue in polymer [ppm] | Polymer properties | | |
|---|---|---|---|---|---|---|---|---|---|---|---|---|---|---|---|---|
| | Diol of formual (a) | | | | | Diol of formula (b) | Other diol | | | | | | | | | Solution b* value |
| | BPDP2 | BNDP2 | BPDN2 | BNDN2 | BHEB6 | BOPPEF | BNEF | BNF | BPEF | BHEB | BINOL | | | nD | V | |
| Example 1 | 100 | | | | | | | | | | | A | 3 | 1.683 | 14.8 | 4.5 |
| Example 2 | | 100 | | | | | | | | | | A | 3 | 1.727 | 12.0 | 4.5 |
| Example 3 | | | 100 | | | | | | | | | C | 8 | 1.750 | 11.9 | 8.2 |
| Example 4 | 50 | | | | | | | | 50 | | | A | 1.7 | 1.664 | 17.9 | 3.5 |
| Example 5 | | 50 | | | | | | | 50 | | | B | 9.2 | 1.692 | 14.6 | 9.1 |
| Example 6 | 40 | | | | | | | 10 | 50 | | | B | 7.4 | 1.677 | 16.9 | 7.8 |
| Example 7 | | 30 | | | | | | 10 | 60 | | | B | 6.4 | 1.690 | 16.5 | 7.0 |
| Example 8 | | | 20 | | | | | 31 | 49 | | | C | 2.3 | 1.693 | 15.8 | 3.9 |
| Example 9 | | | | | 100 | | | | | | | — | 7 | 1.708 | 16.0 | 7.5 |
| Comp. Example 1 | | | | | | | 35 | 10 | | | 55 | — | — | 1.691 | 18.5 | 3.6 |
| Comp. Example 2 | | | | | | | | 10 | 90 | | | — | — | 1.666 | 19.0 | 2.5 |
| Comp. Example 3 | | 50 | | | | | | | 50 | | | D | 42.8 | 1.692 | 14.6 | 18.0 |
| Comp. Example 4 | 50 | | | | | | | | 50 | | | D | 42.8 | 1.685 | N.d. | 34.3 |

TABLE 3

| | Compositional ratio of polyester carbonate or polyester [mol %] | | | | | | | | | | DPC molar ratio* | Synthesis method for diol of formula (a) | Pd residue in polymer [ppm] | Polymer properties | | |
|---|---|---|---|---|---|---|---|---|---|---|---|---|---|---|---|---|
| | Diol of formula (a) | | | Other diol | | | | Dicarboxylic acid | | | | | | | | Solution b* value |
| | BPDP2 | BNDP2 | BPDN2 | BPEF | BNEF | BHEB | EG | BCMB | NDCM | BNAC-E | | | | nD | V | |
| Example 10 | 20 | | | | | 45 | | 35 | | | 0.33 | A | 0.8 | 1.681 | 17.3 | 2.9 |
| Example 11 | | 25 | | | | 30 | | 45 | | | 0.11 | B | 1.1 | 1.698 | 16.3 | 3.1 |
| Example 12 | | | 20 | | | 35 | | 45 | | | 0.11 | B | 4.6 | 1.700 | 15.3 | 5.7 |
| Example 13 | | | 20 | | | 40 | | | 40 | | 0.32 | C | 2.9 | 1.704 | 14.4 | 4.4 |
| Comp. Example 5 | | | | 13.5 | 31.5 | 5 | | 50 | | | — | — | | 1.652 | 20.0 | 2.5 |
| Comp. Example 6 | | | | | 30 | 10 | 10 | | | 50 | — | — | | 1.686 | 18.2 | 5.8 |
| Comp. Example 7 | | | | | 20 | 20 | 10 | | | 50 | — | — | | 1.684 | 18.4 | 7.3 |

TABLE 3-continued

| | Compositional ratio of polyester carbonate or polyester [mol %] | | | | | | | | | DPC | Synthesis method for diol of formula (a) | Pd residue in polymer [ppm] | Polymer properties | | |
|---|---|---|---|---|---|---|---|---|---|---|---|---|---|---|---|
| | Diol of formula (a) | | | Other diol | | | | Dicarboxylic acid | | BNAC- molar ratio* | | | | | Solution b* value |
| | BPDP2 | BNDP2 | BPDN2 | BPEF | BNEF | BHEB | EG | BCMB | NDCM | E | | | | nD | V | |
| Comp. Example 8 | 20 | | | | | 45 | 35 | | | | 0.33 | D | 19.3 | 1.681 | 17.3 | 16.7 |

*Molar ratio of DPC with respect to total diol and dicarboxylic acid

BPDP2: 9,9-bis(4-(2-hydroxyethoxy)phenyl)-2,7-diphenylfluorene
BNDP2: 9,9-bis(6-(2-hydroxyethoxy)-2-naphthyl)-2,7-diphenylfluorene
BPDN2: 9,9-bis(4-(2-hydroxyethoxy)phenyl)-2,7-di(2-naphthyl)fluorene
BNDN2: 9,9-bis(6-(2-hydroxyethoxy)-2-naphthyl)-2,7-di(2-naphthyl)fluorene
BHEB6: 2,2'-bis(2-hydroxyethoxy)-6,6'-diphenyl-1,1'-binaphthalene
BPEF: 9,9-bis(4-(2-hydroxyethoxy)phenyl)fluorene
BOPPEF: 9,9-bis(4-(2-hydroxyethoxy)-3-phenylphenyl)fluorene
BNEF: 9,9-bis(6-(2-hydroxyethoxy)-2-naphthyl)fluorene
BNF: 9,9-bis(6-hydroxy-2-naphthyl)fluorene
BHEB: 2,2'-bis(2-hydroxyethoxy)-1,1'-binaphthalene
BINOL: 2,2'-dihydroxy-1,1'-binaphthalene
EG: ethylene glycol
BCMB: 2,2'-bis(carboxymethoxy)-1,1'-binaphthalene
NDCM: dimethyl naphthalenecarboxylate
BNAC-E: 2,2'-bis(ethoxycarbonylmethoxy)-1,1' binaphthalene FIG. 1 shows plots of the refractive indexes and Abbe numbers of thermoplastic resins used in the optical lenses of Examples 1 to 13 and Comparative Examples 1 to 8. Comparative Example 3 and Comparative Example 8 were excluded since the be values of the solutions were greater than 10. The thermoplastic resins used in the optical lenses of Examples 1 to 13 had high refractive indexes and low Abbe numbers distributed in a range that has not existed in the prior art, being distributed in the range described by mathematical formula (A).

The invention claimed is:

1. An optical lens comprising a thermoplastic resin, wherein the thermoplastic resin contains a repeating unit represented by the following formula (1):

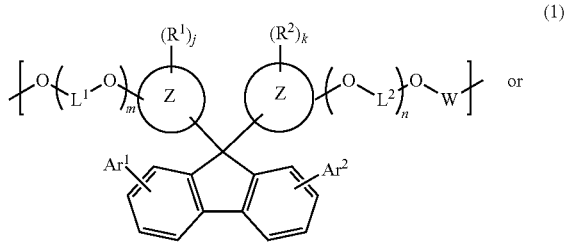

(1)

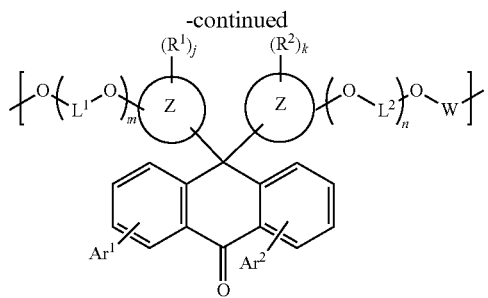

-continued wherein rings Z represent the same or different aromatic hydrocarbon rings, $R^1$ and $R^2$ each independently represent a hydrogen atom, a halogen atom or a hydrocarbon group of 1 to 12 carbon atoms optionally containing an aromatic group, $Ar^1$ and $Ar^2$ each represent an aromatic group optionally containing a substituent, $L^1$ and $L^2$ each independently represent a divalent linking group, j and k each independently represent an integer of 0 or greater, m and n each independently represent 0 or 1, and W is at least one group selected from groups represented by the following formula (2) or (3),

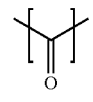

(2)

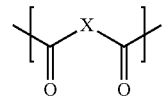

(3)

wherein X represents a divalent linking group,
wherein the thermoplastic resin has a b* value according to the CIE1976 (L*a*b*) color system of 10.0 or lower, as measured using a 13 mass % solution in methylene chloride (a solution of 1.0 g dissolved in 5 ml of methylene chloride), and has a refractive index (nD) and Abbe number (v) satisfying the following mathematical formula (A):

$$nD \leq -0.02 \times v + 2.040 \quad (A)$$

(where $1.660 < nD$).

2. The optical lens according to claim 1, wherein the thermoplastic resin has a refractive index (nD) and Abbe number (v) satisfying the following mathematical formula (B):

$$nD \geq -0.02 \times v + 1.960 \quad (B)$$

3. The optical lens according to claim 1, wherein a specific viscosity of the thermoplastic resin is 0.12 to 0.40.

4. The optical lens according to claim 1, wherein the glass transition temperature of the thermoplastic resin is 130 to 170° C.

5. The optical lens according to claim 1, wherein the thermoplastic resin is a polyester, polyester carbonate or polycarbonate.

6. The optical lens according to claim 1, wherein the amount of residual palladium in the thermoplastic resin is 10 ppm or lower.

* * * * *